United States Patent [19]

Locatell, Jr. et al.

[11] 4,386,216
[45] May 31, 1983

[54] MAGENTA DYE DEVELOPERS

[75] Inventors: Louis Locatell, Jr., Wellesley Hills; Howard G. Rogers, Weston; Ruth C. Bilofsky, Lexington; Ronald F. Cieciuch, Brookline; Charles M. Zepp, Boylston, all of Mass.

[73] Assignee: Polaroid Corporation, Cambridge, Mass.

[21] Appl. No.: 143,282

[22] Filed: Apr. 24, 1980

Related U.S. Application Data

[63] Continuation-in-part of Ser. No. 32,888, Apr. 24, 1979, abandoned.

[51] Int. Cl.³ .................................... C07D 311/82
[52] U.S. Cl. .................................. 549/394; 430/224
[58] Field of Search ................ 260/239.6, 336, 335; 549/394

[56] References Cited

U.S. PATENT DOCUMENTS

| | | | |
|---|---|---|---|
| 3,022,316 | 2/1962 | Bestian et al. | 260/336 |
| 3,772,335 | 11/1973 | Meininger et al. | 260/336 |
| 3,956,300 | 5/1976 | Austin et al. | 549/394 |
| 4,076,529 | 2/1978 | Fleckenstein et al. | 96/3 |
| 4,264,506 | 4/1981 | Borror et al. | 549/394 |
| 4,264,507 | 4/1981 | Borror et al. | 549/394 |

OTHER PUBLICATIONS

Meininger et al., Chem. Abst., vol. 75, Abst. 65296u, (1971), (Abst. of Ger. Offen. 1,955,849).
Venkataraman, The Chemistry of Synthetic Dyes, vol. VIII, pp. 331 to 381, Academic Press, NY, (1978).

Primary Examiner—Ethel G. Love
Attorney, Agent, or Firm—Stanley H. Mervis

[57] ABSTRACT

Diffusion transfer color processes and products are disclosed employing image-dye providing materials providing magenta image dyes having the chromophoric system represented by the formula

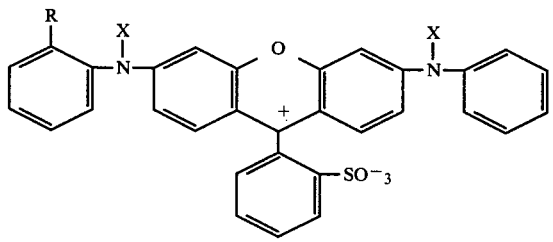

wherein each R is the same or different and is an alkyl group, and each X is the same or different and is hydrogen or an alkyl group (including substituted alkyl). The dye image-providing material includes a diffusion control moiety, such as a hydroquinonyl group, and may be diffusible or nondiffusible as a function of the diffusion control moiety.

15 Claims, 1 Drawing Figure

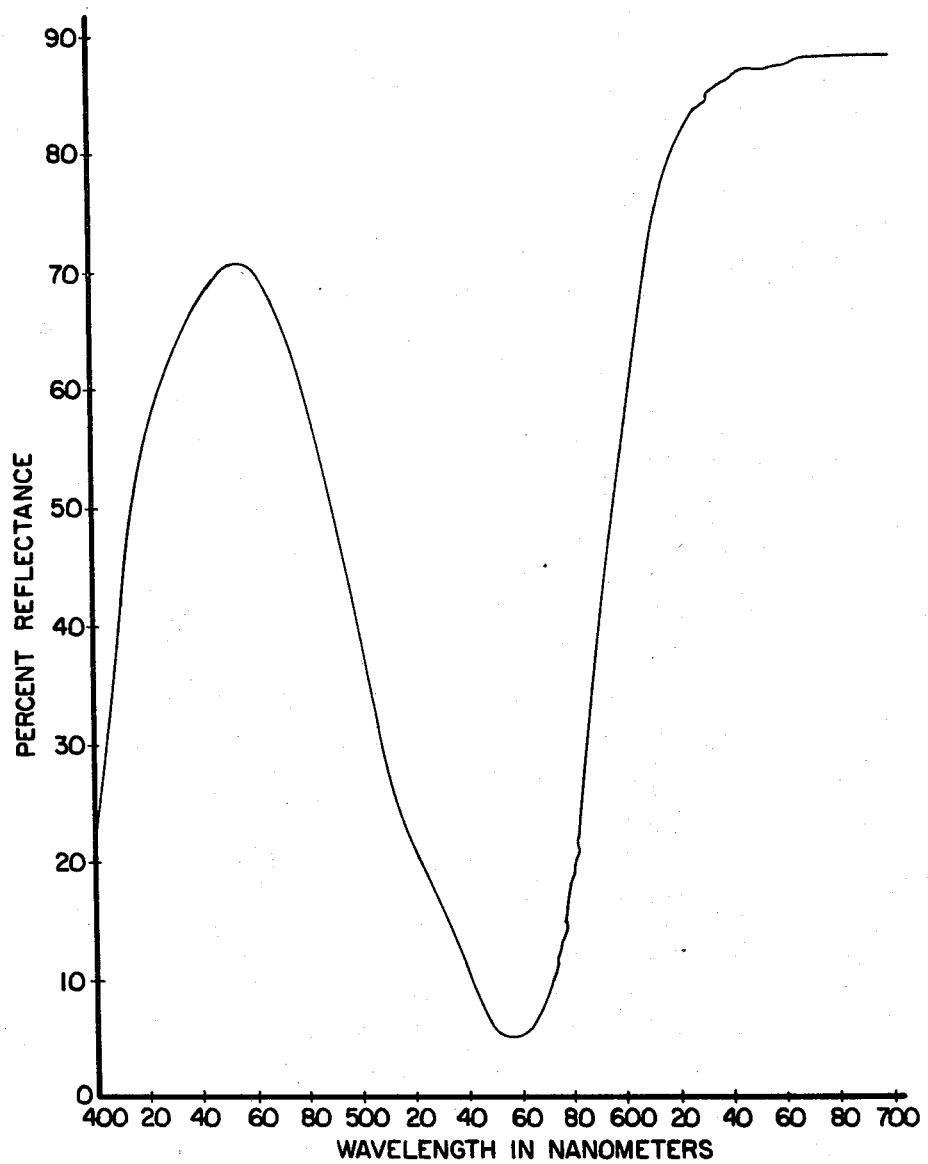

MAGENTA DYE DEVELOPERS

This application is a continuation-in-part of copending application Ser. No. 32,888 filed Apr. 24, 1979 (now abandoned).

This invention relates to photography, and, more, particularly, to magenta dyes for use in providing diffusion transfer color images, and to photographic products and processes employing such magenta image dyes.

Multicolor images formed in accordance with the principles of subtractive color photography employ yellow, magenta and cyan image dyes. The yellow dye ideally transmits only green and red light and absorbs only blue light, and thus is sometimes referred to as "minus blue". In like manner, the magenta ("minus green") dye ideally absorbs only green light and transmits only blue and red light, and the cyan ("minus red") dye ideally absorbs only red light and transmits only blue and green light. Unfortunately, the dyes available for use in subtractive color photography are not "ideal" dyes, but tend to absorb some of the light that they ideally should transmit. This extra absorption results in less effective reproduction by the final image of one or more colors present in the original subject.

This problem may be illustrated by considering the reproduction of blue light: A multicolor photosensitive element, comprising a blue-sensitive silver halide layer, a green-sensitive silver halide layer and a red-sensitive silver halide layer, said silver halide layers having associated therewith, respectively, a yellow image dye-providing material, a magenta image dye-providing material, and a cyan image dye-providing material, is exposed to blue light in an amount effective to fully expose the blue-sensitive layer. Only the blue-sensitive silver halide layer is exposed; the green-sensitive and red-sensitive silver halide emulsion layers remain unexposed. If such an exposed photosensitive element were processed by diffusion transfer techniques, the yellow image dye-providing material would remain in the developed photosensitive element (negative component) but magenta and cyan image dyes would be transferred to the image-receiving layer (positive component). Since the magenta and cyan image dyes are "minus green" and "minus red" respectively, the *combination* of magenta and cyan dyes appear blue, i.e., they transmit blue light to the viewer and absorb green and red, thus reproducing the blue record of the original subject.

From this illustration it will be readily apparent that if either the magenta or cyan image dyes also absorb blue light, the purity and quality of the "blue image" will be impaired. In the world of practical color photography, such unwanted absorption, sometimes referred to as "tail" absorption, is the rule rather than the exception. Magenta image dyes typically exhibit significant absorption in the blue region.

The present invention is concerned with providing magenta image dyes exhibiting reduced blue absorption, i.e., increased blue transmission.

The primary object of this invention is to provide magenta image dye-providing materials which yield diffusion transfer color images exhibiting more desirable color characteristics.

A further object of this invention is to provide magenta dye developers which transmit a high proportion of blue light.

Another object of this invention is to provide magenta image dye-providing materials useful in dye release diffusion transfer processes, e.g., of the redox dye release or the silver-catalyzed dye release types, to provide magenta image dyes exhibiting high blue transmission.

A further object of this invention is to provide magenta image dye-providing materials which exhibit good absorption of green light while transmitting a high proportion of blue light.

Still another object of the present invention is to provide diffusion transfer products and processes employing such magenta image dye-providing materials.

Other objects of this invention will in part be obvious and will in part appear hereinafter.

For a fuller understanding of the nature and objects of the invention, reference should be had to the following detailed description.

This invention is particularly directed to photographic processes wherein the desired image is obtained by processing an exposed photosensitive silver halide material, with a processing composition distributed between two sheet-like elements, one of said elements including said photosensitive material. The processing composition is so applied and confined within and between the two sheet-like elements as not to contact or wet outer surfaces of the superposed elements, thus providing a film unit or film packet whose external surfaces are dry. The processing composition may be viscous or non-viscous, and preferably is distributed from a single-use rupturable container; such pressure rupturable processing containers are frequently referred to as "pods". The final image may be monochrome or multicolor, and is formed in an image-receiving layer included in one of said sheet-like elements.

As is well known in diffusion transfer photography, image dye-providing materials which may be employed in such processes generally may be characterized as either (1) initially soluble or diffusible in the processing composition but which are selectively rendered non-diffusible imagewise as a function of development; or (2) initially insoluble or non-diffusible in the processing composition but which selectively provide a diffusible product imagewise as a function of development. These image dye-providing materials may be complete dyes or dye intermediates, e.g., color couplers. The requisite differential in mobility or solubility may, for example, be obtained by a chemical action such as a redox reaction, a coupling reaction, or a cleavage reaction.

In accordance with this invention, it has been found that magenta image dyes containing the chromophoric system represented by

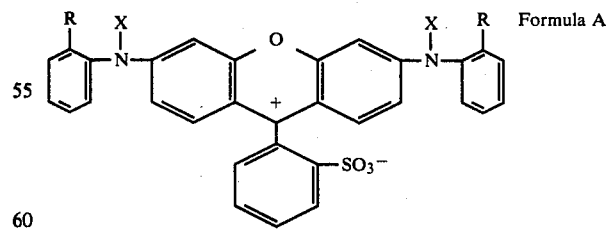

Formula A wherein each R is an alkyl group and each X is either hydrogen or an alkyl group (including substituted alkyl), exhibit highly desirable spectral properties, including high blue transmission. Each R and each X may be the same or different. In the preferred embodiments, each R is an alkyl group of 1 to 4 carbons, and preferably each R is a methyl group. In particularly useful and preferred embodiments, each R and each X is an alkyl group, with at least one said X being a substituted alkyl, such as an aralkyl.

Image dye-providing materials capable of providing image dyes containing the chromophoric system of Formula A may be provided by including a diffusion control substituent Y which substituent includes a diffusion control moiety D. One such group of image dye-providing materials may be represented by Formula B:

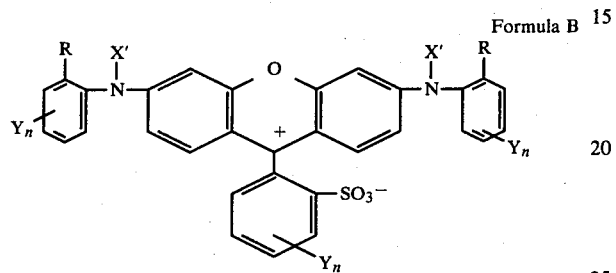

Formula B wherein each Y is a substituent containing a diffusion control moiety D, X' is hydrogen, alkyl (including substituted alkyl) or $-(CH_2-X^2-D)_n$ wherein $X^2$ is a divalent linking group (preferably an alkylene group of 1-4 carbons), and each n is 0 or 1, provided that at least one n is 1. Image dye-providing materials within Formula B, as a function of the particular diffusion control moiety D, are suitable for use in diffusion transfer processes employing either initially diffusible or initially nondiffusible image dye-providing materials. As examples of diffusion control moieties D, mention may be made of hydroquinonyl groups, color coupling groups, sulfonamido phenol groups which cleave or ring close following oxidation to release a diffusible dye or dye intermediate, and of thiazolidine groups whose cleavage is silver catalyzed. The diffusion control moiety D may be attached to a covalent bond or a divalent linking group, e.g., an alkylene radical of 1 to 4 carbons to complete the substituent Y. Dyes wherein X' is not hydrogen are preferred, and have been found to exhibit a shift in absorption maximum towards middle green and a narrowed absorption band width, as compared with dyes where X' is hydrogen. Further, dyes wherein X' is not hydrogen show less color shift in alkali. In contrast to dyes where the $-SO_3^-$ is replaced by a $-COO^-$ group, the dyes of this invention resist ring closure and resultant decolorization in acidic environments. Where the image dye-providing material is initially diffusible, a suitable ballast group, e.g., a long chain alkyl group, may be attached to the diffusion control group.

One resonance form of the chromophoric system represented by Formula A also may be represented as follows:

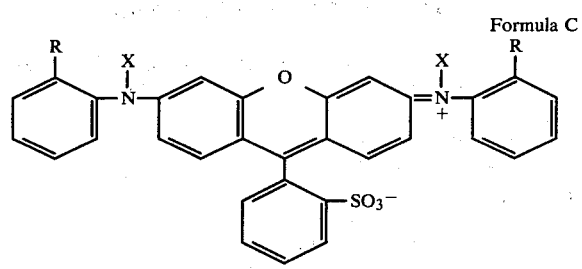

Formula C

In the preferred embodiment of this invention, the diffusion control group is a hydroquinonyl moiety, and the resulting dye developers are initially diffusible image dye-providing materials. As described in U.S. Pat. No. 2,983,606 issued May 9, 1961 to Howard G. Rogers, a photosensitive element containing a dye developer and a silver halide emulsion is photoexposed and a processing composition applied thereto, for example, by immersion, coating, spraying, flowing, etc., in the dark. The exposed photosensitive element superposed prior to, during, or after the processing composition is applied, on a sheet-like support element which may be utilized as an image-receiving element. In a preferred embodiment, the processing composition is applied to the exposed photosensitive element in a substantially uniform layer as the photosensitive element is brought into superposed relationship with the image-receiving layer. The processing composition, positioned intermediate the photosensitive element and the image-receiving layer, permeates the emulsion to initiate development of the latent image contained therein. The dye developer is immobilized or precipitated in exposed areas as a consequence of the development of the latent image. This immobilization is apparently, at least in part, due to a change in the solubility characteristics of the dye developer upon oxidation and especially as regards its solubility in alkaline solutions. It may also be due in part to a tanning effect on the emulsion by oxidized developing agent, and in part to a localized exhaustion of alkali as a result of development. In unexposed and partially exposed areas of the emulsion, the dye developer is unreacted and diffusible and thus provides an imagewise distribution of unoxidized dye developer, diffusible in the processing composition, as a function of the point-to-point degree to exposure of the silver halide emulsion. At least part of this imagewise distribution of unoxidized dye developer is transferred, by imbibition, to a superposed image-receiving layer or element, said transfer substantially excluding oxidized dye developer. The image-receiving layer receives a depthwise diffusion, from the developed emulsion, of unoxidized dye developer without appreciably disturbing the imagewise distribution thereof to provide a reversed or positive color image of the developed image. The image-receiving element may contain agents adapted to mordant or otherwise fix the diffused, unoxidized dye developer. In a preferred embodiment of said U.S. Pat. No. 2,983,606 and in certain commercial applications thereof, the desired positive image is revealed by separating the image-receiving layer from the photosensitive element at the end of a suitable imbibition period. Alternatively, as also disclosed in said U.S. Pat. No. 2,983,606, the image-receiving layer need not be separated from its superposed contact with the photosensitive element, subsequent to transfer image formation, if the support for the image-receiving layer, as well as any other layers intermediate said support and image-receiving layer, is transparent and a processing composition containing a substance, e.g., a white pigment, effective to mask the developed silver halide emulsion or emulsions is applied between the image-receiving layer and said silver halide emulsion or emulsions.

Dye developers, as noted in said U.S. Pat. No. 2,983,606, are compounds which contain, in the same molecule, both the chromophoric system of a dye and also a silver halide developing function. By "a silver halide developing function" is meant a grouping adapted to develop exposed silver halide. A preferred silver halide development function is a hydroquinonyl group. In general, the development function includes a benzenoid developing function, that is, an aromatic developing group which forms quinonoid or quinone substances when oxidized.

Multicolor images may be obtained using dye developers in diffusion transfer processes by several techniques. One such technique contemplates obtaining multicolor transfer images utilizing dye developers by employment of an integral multilayer photosensitive element, such as is disclosed in the aforementioned U.S. Pat. No. 2,983,606 and in U.S. Pat. No. 3,345,163 issued Oct. 3, 1967 to Edwin H. Land and Howard G. Rogers, wherein at least two selectively sensitized photosensitive strata, superposed on a single support, are processed, simultaneously and without separation, with a single common image-receiving layer. A suitable arrangement of this type comprises a support carrying a red-sensitive silver halide emulsion stratum, a green-sensitive silver halide emulsion stratum and a blue-sensitive silver halide emulsion stratum, said emulsions having associated therewith, respectively, for example, a cyan dye developer, a magenta dye developer and a yellow dye developer. The dye developer may be utilized in the silver halide emulsion stratum, for example in the form of particles, or it may be disposed in a stratum behind the appropriate silver halide emulsion strata. Each set of silver halide emulsion and associated dye developer strata may be separated from other sets by suitable interlayers, for example, by a layer or stratum of gelatin or polyvinyl alcohol. In certain instances, it may be desirable to incorporate a yellow filter in front of the green-sensitive emulsion and such yellow filter may be incorporated in an interlayer. However, where desirable, a yellow dye developer of the appropriate spectral characteristics and present in a state capable of functioning as a yellow filter may be so employed and a separate yellow filter omitted.

Particularly useful products for obtaining multicolor dye developer images are disclosed in U.S. Pat. No. 3,415,644 issued Dec. 10, 1968 to Edwin H. Land. This patent discloses photographic products and processes wherein a photosensitive element and an image-receiving element are maintained in fixed relationship prior to exposure, and this relationship is maintained as a laminate after processing and image formation. In these products, the final image is viewed through a transparent (support) element against a light-reflecting, i.e., white background. Photoexposure is made through said transparent element and application of the processing composition provides a layer of light-reflecting material to provide a white background. The light-reflecting material (referred to in said patent as an "opacifying agent") is preferably titanium dioxide, and it also performs an opacifying function, i.e., it is effective to mask the developed silver halide emulsions so that the transfer image may be viewed without interference therefrom, and it also acts to protect the photosensitive silver halide emulsions from post-exposure fogging by light passing through said transparent layer if the photoexposed film unit is removed from the camera before image-formation is completed.

U.S. Pat. No. 3,647,437, issued Mar. 7, 1972 to Edwin H. Land, is concerned with improvements in products and processes disclosed in said U.S. Pat. No. 3,415,644, and discloses the provision of light-absorbing materials to permit such processes to be performed, outside of the camera in which photoexposure is effected, under much more intense ambient light conditions. A light-absorbing material or reagent, preferably a pH-sensitive phthalein dye, is provided so positioned and/or constituted as not to interfere with photoexposure but so positioned between the photoexposed silver halide emulsions and the transparent support during processing after photoexposure as to absorb light which otherwise might fog the photoexposed emulsions. Furthermore, the light-absorbing material is so positioned and/or constituted after processing as not to interfere with viewing the desired image shortly after said image has been formed. In the preferred embodiments, the light-absorbing material, also sometimes referred to as an optical filter agent, is initially contained in the processing composition together with a light-reflecting material, e.g., titanium dioxide. The concentration of the light-absorbing dye is selected to provide the light transmission opacity required to perform the particular process under the selected light conditions.

In a particularly useful embodiment, the light-absorbing dye is highly colored at the pH of the processing composition, e.g., 13–14, but is substantially non-absorbing of visible light at a lower pH, e.g., less than 10–12. This pH reduction may be effected by an acid-reacting reagent appropriately positioned in the film unit, e.g., in a layer between the transparent support and the image-receiving layer.

The dye developers are preferably selected for their ability to provide colors that are useful in carrying out subtractive color photography, that is, the previously mentioned cyan, magenta and yellow. The dye developers employed may be incorporated in the respective silver halide emulsion or, in the preferred embodiment, in a separate layer behind the respective silver halide emulsion, and such a layer of dye developer may be applied by use of a coating solution containing the respective dye developer distributed, in a concentration calculated to give the desired coverage of dye developer per unit area, in a film-forming natural, or synthetic, polymer, for example, gelatin, polyvinyl alcohol, and the like, adapted to be permeated by the processing composition.

In accordance with the present invention, magenta dye developers containing the chromophoric system of Formula A may be provided by dye developers as defined in Formula B wherein the diffusion control moiety D is a silver halide developing moiety, e.g., a hydroquinonyl group. In such image dye-providing materials the diffusion control substituent Y may be represented by

—A—D wherein D is a hydroquinonyl group and A is a covalent bond or a divalent linking group, e.g., alkylene. Examples of such dye developers include:
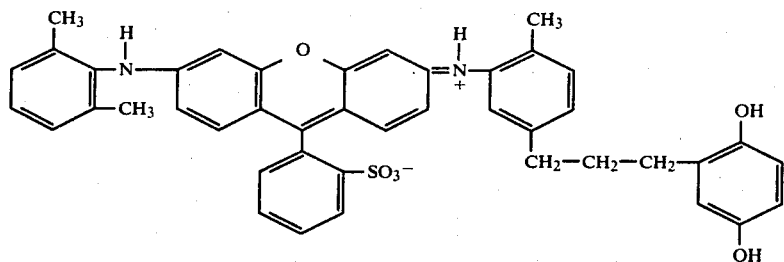
Dye 1
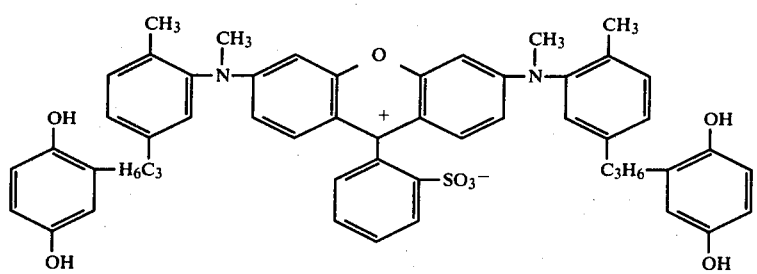
Dye 2
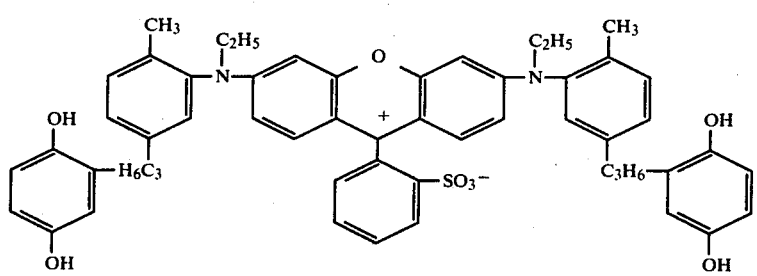
Dye 3
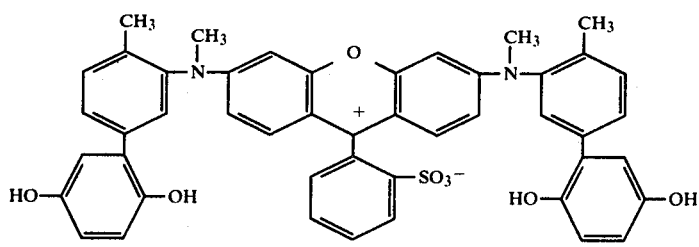
Dye 4
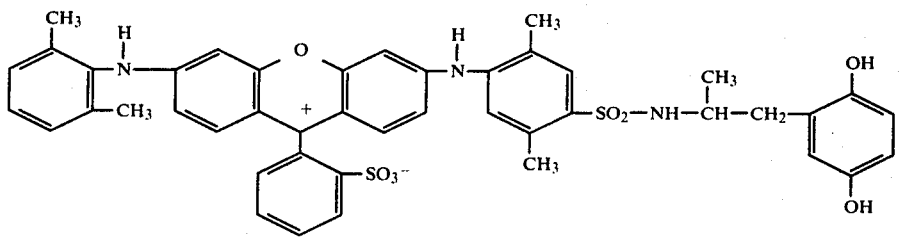
Dye 5
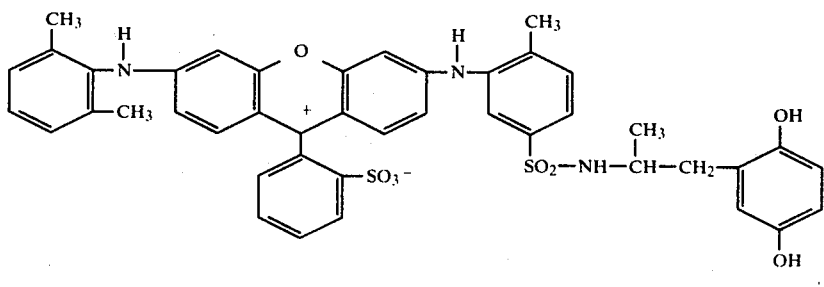
Dye 6

-continued
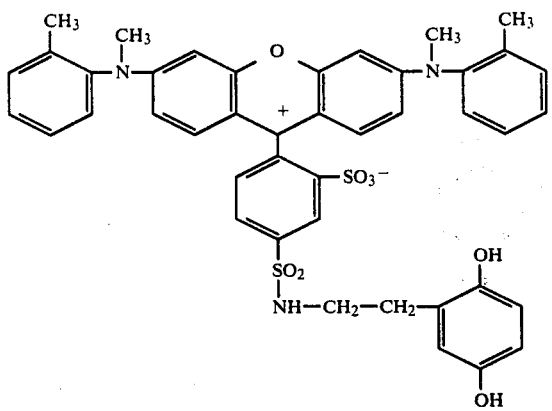
Dye 7
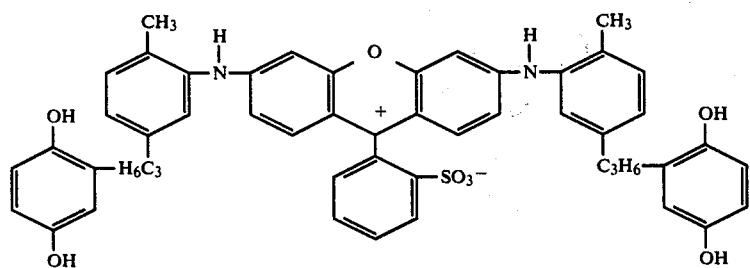
Dye 8
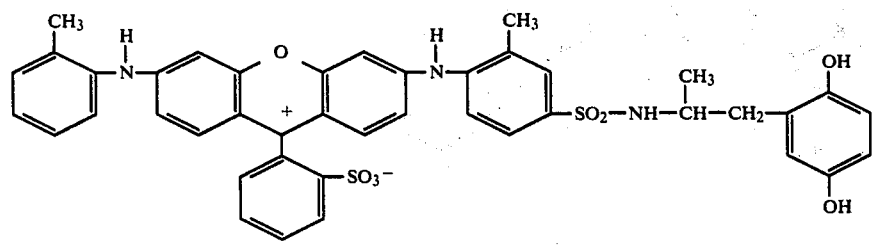
Dye 9
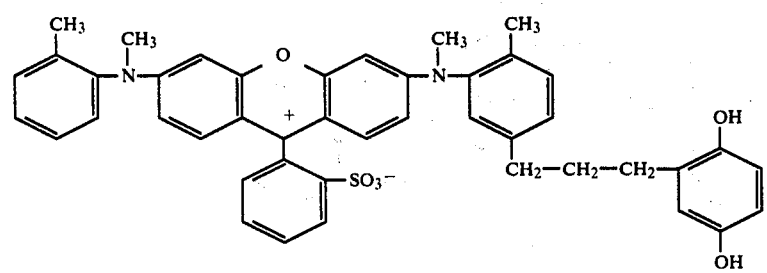
Dye 10
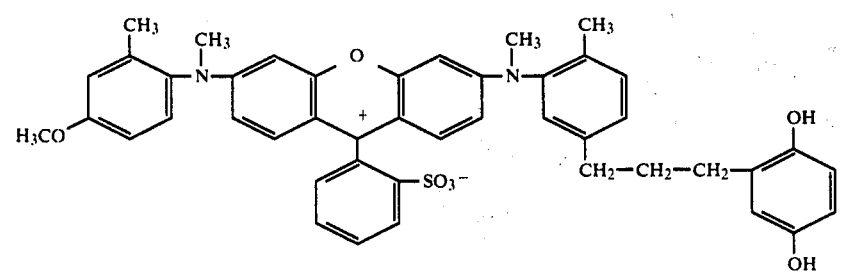
Dye 11

-continued
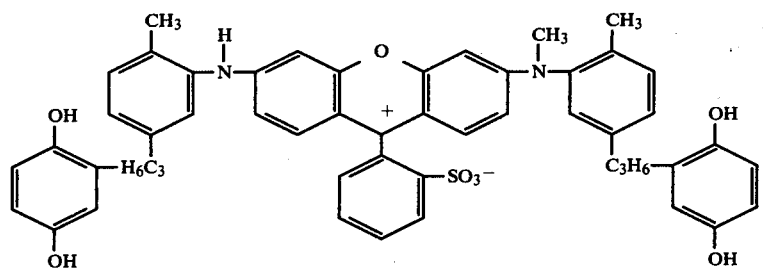
Dye 12
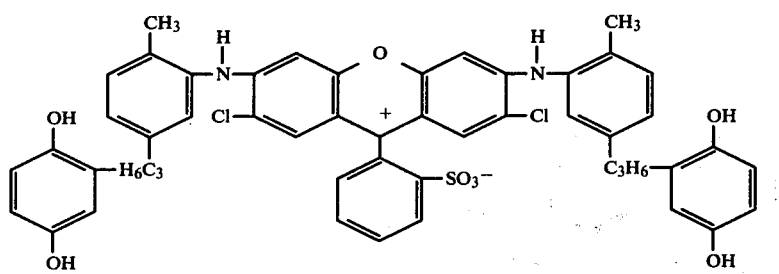
Dye 13
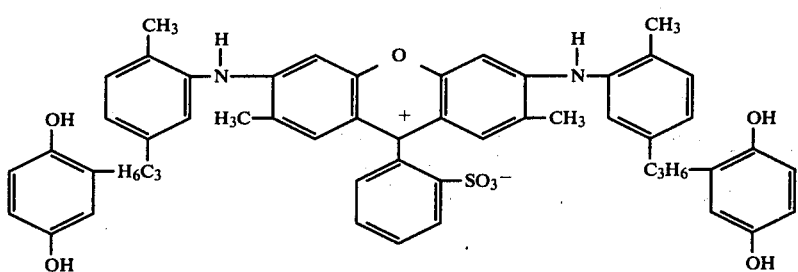
Dye 14
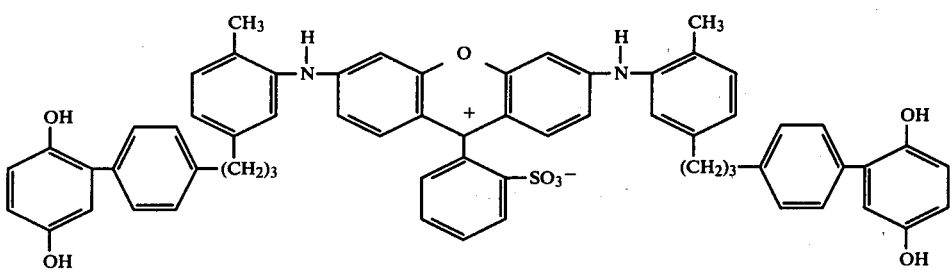
Dye 15
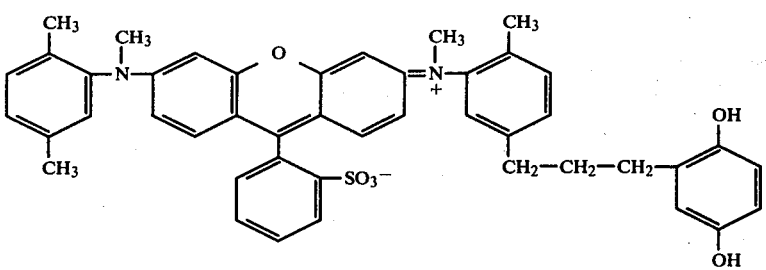
Dye 16

-continued
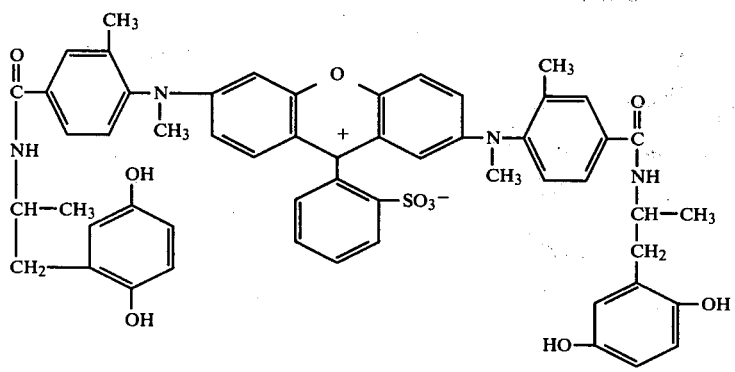
Dye 17
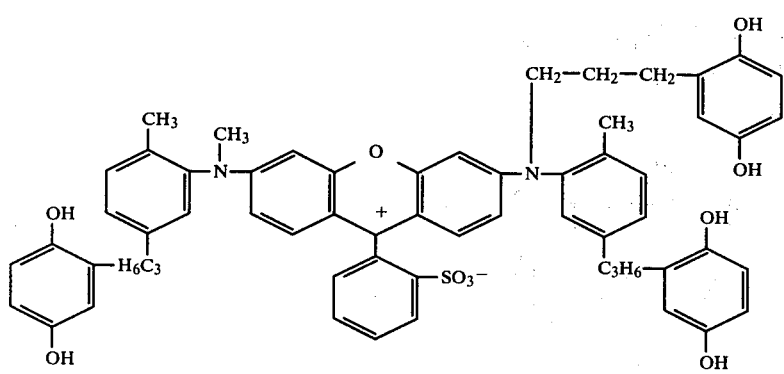
Dye 18
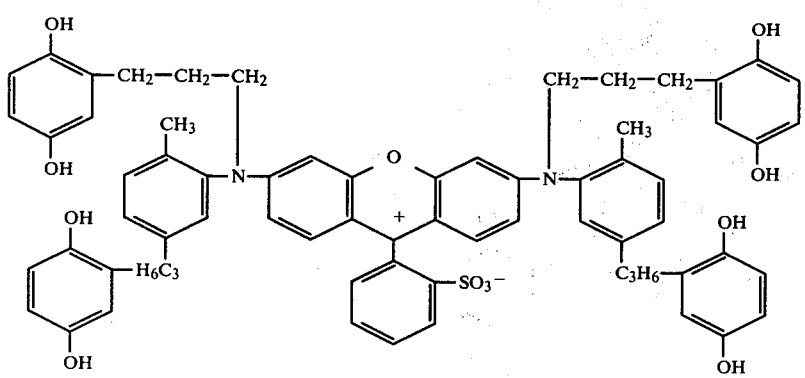
Dye 19
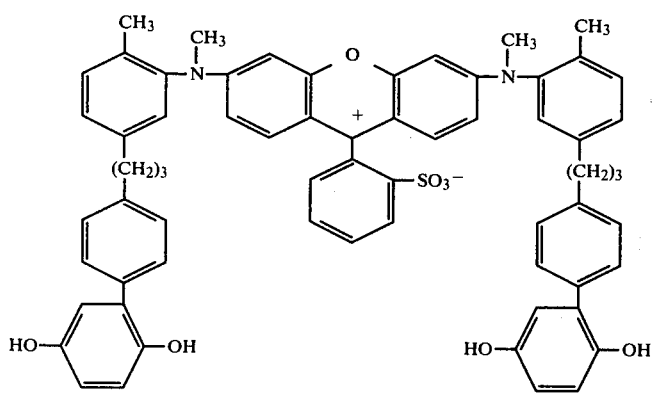
Dye 20

-continued
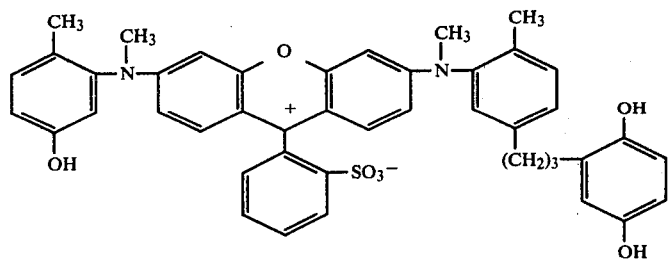
Dye 21
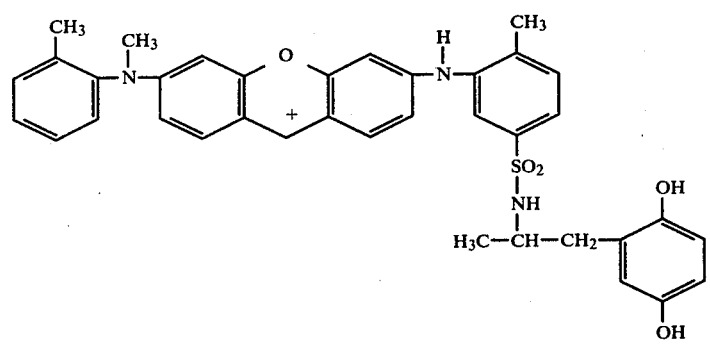
Dye 22
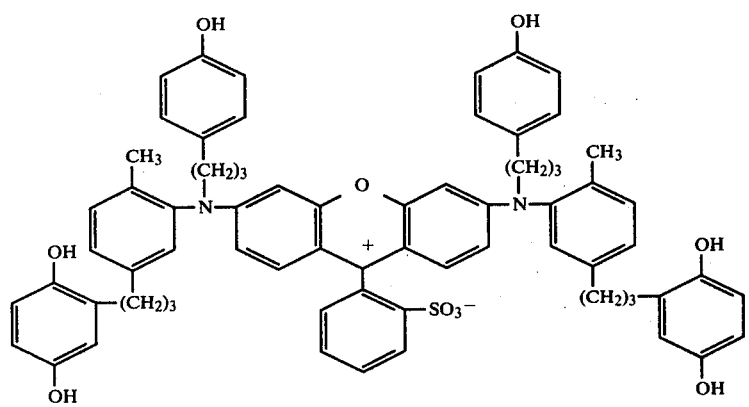
Dye 23
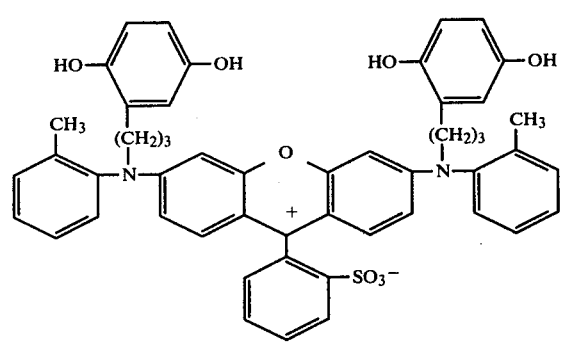
Dye 24

-continued

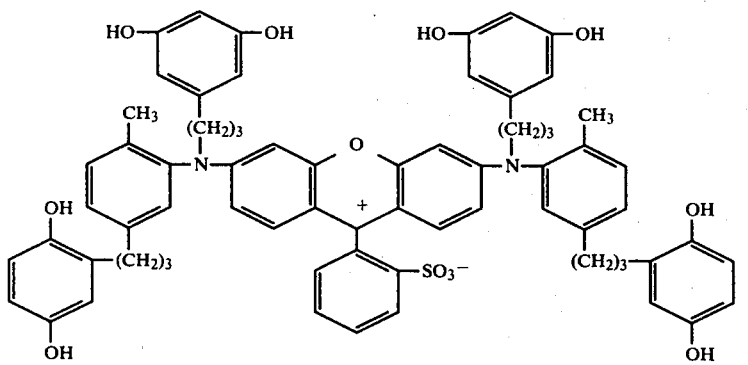

Dye 25

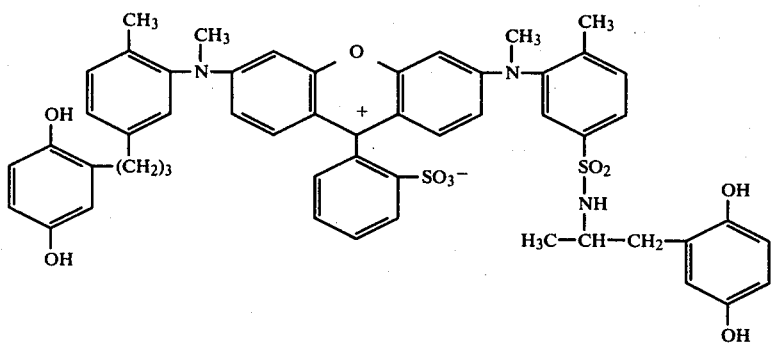

Dye 26

Dyes 18 and 19 are the subject of the copending application of Alan L. Borror, Louis Cincotta, Edward M. Mahoney, and Michael H. Feingold, Ser. No. 32,876 filed Apr. 24, 1979, now abandoned and replaced by continuation-in-part applications Ser. Nos. 143,290 and 143,438, both filed Apr. 24, 1980 now U.S. Pat. Nos. 4,264,507 and 4,264,704, both issued Apr. 28, 1981, respectively.

Dye developers of the type described above may be prepared, for example, by the reaction of dichlorosulfone fluorescein

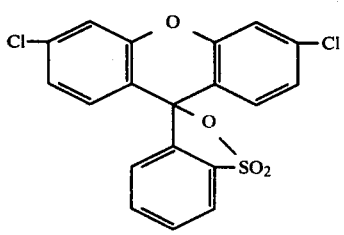

with, e.g., a compound of the formula

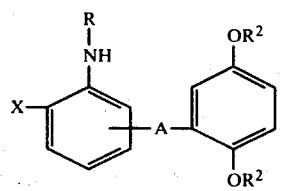

wherein X, R and Y are as defined above, and each $R^2$ is the same and is hydrogen or a lower alkyl group. Where $R^2$ is alkyl, dealkylation of the resulting product regenerates the hydroquinone moiety. Where it is desired to have only one hydroquinonyl group in the dye developer, the dichloro starting material is first reacted to replace one chloro group with an anilino group, following by the above described reaction to introduce the hydroquinonyl-containing anilino group. Alternatively, an aminoalkylhydroquinone may be reacted with a sulfonyl chloride-substituted anilino-substituted sulfone fluorescein to obtain dye developers such as Dyes 5 and 6 above.

Compounds within Formula D wherein A is an alkylene group of 1 to 5 carbons are described in U.S. Pat. No. 3,236,893, issued Feb. 22, 1966 to Blout, Green, Rogers, Simon and Woodward. Compounds within Formula D wherein A is a covalent bond are described in U.S. Pat. No. 3,134,811 issued May 26, 1964 to Simon. Compounds within Formula C wherein A is —SO$_2$— are described in U.S. Pat. No. 3,218,312 issued Nov. 16, 1965 to Green. Compounds within Formula D wherein A is —S-alkylene ("alkylene" containing 1-5 carbons), e.g.,

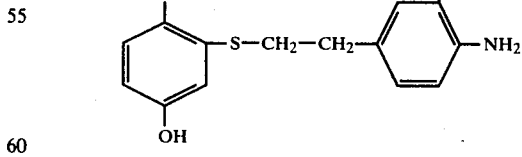

are described in U.S. Pat. No. 3,009,958 issued Nov. 21, 1961 and U.S. Pat. No. 3,081,339 issued Mar. 12, 1963, both issued to Green and Rogers. Compounds within Formula D wherein A is —S— are described in U.S. Pat. No. 3,009,958 issued Nov. 21, 1961 to Green and Rogers. Compounds within Formula D where A is —O— are described in U.S. Pat. No. 3,061,434 issued Oct. 3, 1961 to Green and Solodar. For convenience, the disclosures of these U.S. patents are hereby incorporated herein.

Where the anilino group(s) contain an amino or an aminoalkyl substituent, a hydroquinonyl group may be introduced by reaction with a carboxylic acid-substituted hydroquinone, e.g., homogentisic acid lactone or homogentisic acid chloride, following the procedures described in U.S. Pat. No. 3,288,778 issued Nov. 29, 1966 to Blout, Cohen, Green, Rogers, Simon and Woodward. Alternatively, a compound such as

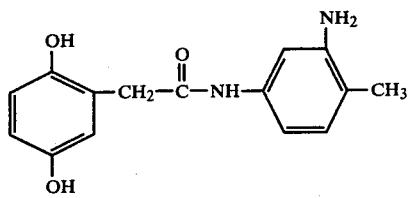

may be reacted with one or both chlorines of dichloroof the above monochloro intermediate and 4.0 g. (15.7×10⁻³m) of

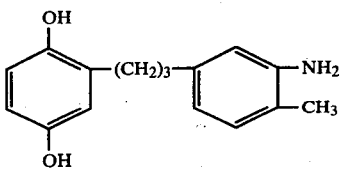

This solution was stirred at 130° C. while nitrogen was slowly bubbled through. Aliquots were periodically worked up (TLC in methanol/chloroform, 15/85 parts by volume). After 4 hours, the hot reaction mixture was poured into 5% hydrochloric acid. The precipitate was filtered off, washed with water and dried. A small amount of the monochloro intermediate was found to be present, and this was removed by extraction with chloroform in a Soxlet extractor. 3.0 g. (81% yield) of the thus purified Dye 1

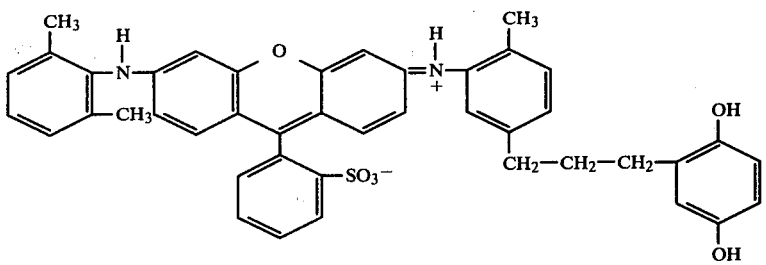

sulfone fluorescein; compounds of this type are described in U.S. Pat. No. 3,214,469 issued Oct. 26, 1965 to Green and Husek.

The following examples of the preparation of dye developers in accordance with this invention are given for purposes of illustration and are not intended to be limiting.

EXAMPLE 1

5.0 g. (0.012 m) of dichlorosulfone fluorescein and 5.0 g. (0.041 m) of 2,6-dimethylaniline were refluxed together in 50 ml. of methanol for 0.5 hour. Excess methanol was stripped off, and the residue was triturated with diethyl ether until it was solid. The solid was filtered off, washed well with diethyl ether and dried. Chromatography on florisil (90/10 chloroform/methanol, by volume, as solvent) gave 3.0 g. (44%) of the monochloro intermediate

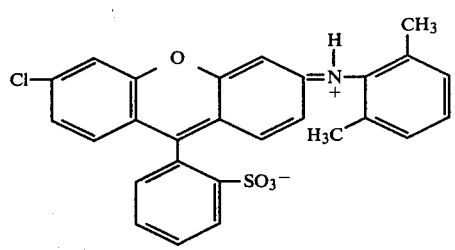

as an orange powder. 25 ml. of ethylene glycol was heated in an oil bath set at 130° C. and nitrogen was bubbled in, with stirring, for 1 hour. To the hot, deoxygenated ethylene glycol was added 3.0 g. (5.2×10⁻³m)

was obtained, and this product exhibited maximum absorption in methyl cellosolve at 534 nanometers, epsilon 64,000. Column chromatography with methanol/tetrahydrofuran, (15/85 parts by volume) gave a more pure sample of Dye 1 exhibiting an epsilon of 79,000 at 534 nanometers in methyl cellosolve.

EXAMPLE 2

In a 250 ml. flask were placed 30 ml. of dimethyl sulfoxide, 6.0 g. (0.0148 m) of dichlorosulfone fluorescein, 9.0 g. (0.0300 m) of

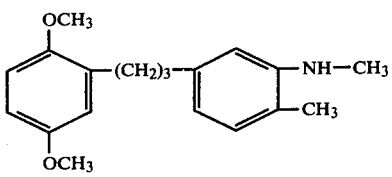

and 6.0 g. of magnesium oxide. Argon was bubbled through the stirred mixture for a few minutes, and the flask was then placed in an oil bath set at 140° C. The reaction was followed by TLC (Q5F plates, 10/90 methanol/chloroform, by volume). After 2½ hours the reaction appeared to be nearly complete. Sodium sulfanilate (10.0 g.) was added, and the reaction mixture kep at 140° C. for an additional hour. After cooling to 90° C., 30 ml. of water was added, and the mixture was stirred and cooled until the dye mass solidified. The solid was filtered off, washed well with water, dissolved in chloroform and dried over calcium sulfate. Evaporation of the chloroform gave 15.0 g. of crude dye. The crude dye was redissolved in chloroform and placed upon a florisil column. The column was eluted with methanol/chloroform (15/85 parts by volume), and dye being collected as it washed off the column. Evaporation of the eluent gave 8.0 g. (58%) of

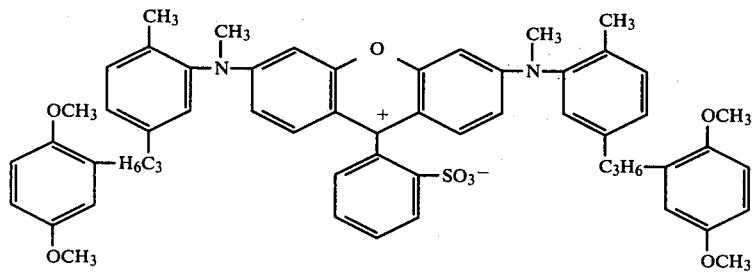

A solution of 8.0 g. ($8.6 \times 10^{-3}$m) of this dye in 500 ml. of chloroform was cooled in a dry ice-acetone bath, and 8.0 ml. (21.1 g., 0.084 m) of boron tribromide dissolved in 50 ml. of chloroform was slowly dripped into the stirred solution. Upon complete addition of the boron tribromide, the mixture was allowed to come to room temperature and was then stirred overnight. A solution of 50 ml. of concentrated hydrochloric acid in 450 ml. of water was cautiously added, and the mixture was stirred and refluxed for 1 hour. The warm mixture was filtered, and the solid was washed well with water and dried to give 6.0 g. (80%) of Dye 2:

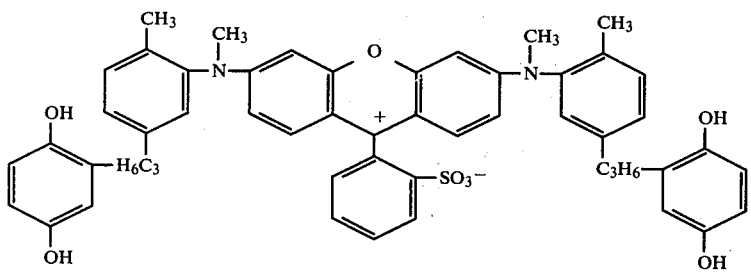

Dye 2 was found to exhibit maximum absorption in methyl cellosolve at 548 nanometers, epsilon 104,000.

The dimethoxy intermediate

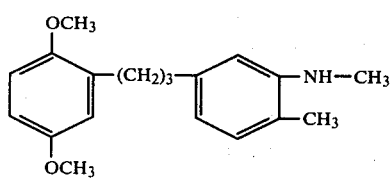

employed in Example 2 above was prepared as follows:

EXAMPLE 2-A 600 g. (362 ml.) of concentrated sulfuric acid and 100 g. (71.5 ml.) of concentrated nitric acid (d. 1.42) were combined in a 3-liter three neck round bottom flask and cooled to 0° C. in an ice-salt bath. To this was added 120 g. (1 mole) of tolualdehyde, with stirring and dropwise at a rate that kept the temperature at about 5° C. After addition of the aldehyde, the solution was stirred at 0° C. for one hour and then dumped onto ice. Crude 4-methyl-3-nitrobenzaldehyde precipitated as a pale yellow solid which was filtered off, washed with water and dried (m.p. 41°-43° C.). 18.0 g. (0.1 m) of 2,5-dimethoxyacetophenone and 16.5 g. (0.1 m) of 4-methyl-3-nitrobenzaldehyde were dissolved in 75 ml. of absolute ethanol by gentle heating on a steam bath. Gaseous hydrogen chloride was bubbled in with stirring for a few minutes. The now hot, green solution was stoppered and left at room temperature overnight. Crystalline 3-nitro-4-methyl-2',5'-dimethoxy chalcone

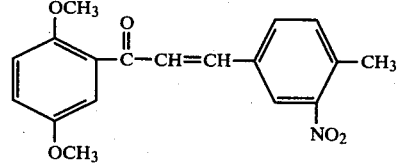

was filtered off and washed well with cold alcohol; yield 28 g. (86%). Material recrystallized from toluene melted at 146°-147° C. 30 g. (0.046 m) of this chalcone was hydrogenated on a Parr apparatus in ethanol at 40 lbs./in.² pressure using 10% palladium-on-charcoal catalyst. After hydrogen uptake ceased, the bottle was removed and the precipitate dissolved by heating. The catalyst was filtered from the hot solution. Upon cooling of the filtrate

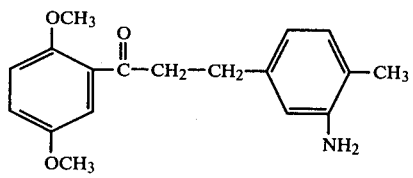

crystallized out as white crystals. 5.8 g. (0.019 m) of this ketone was refluxed in 25 ml. of absolute ethanol with 2.5 g. (0.05 m) of hydrazine hydrate for 1 hour. The ethanol was stripped off, and 4.0 g. (0.071 m) of powdered KOH was added. This mixture was stirred and heated under nitrogen at 235° (oil bath temperature) for 45 minutes. After cooling, the residue was stirred in water to dissolve crystallized KOH, and the oily material was taken up in diethyl ether. After washing with water, the ether solution was dried over drierite. Evaporation of the diethyl ether gave an oil which solidified upon standing. This solid was dissolved in 5 ml. of hot toluene and 15 ml. of boiling petroleum ether was added. On cooling the amine

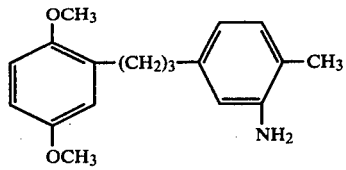

crystallized out as a white powder (3.1 g., 57% yield; m.p. 65°-66° C.). 10.0 g. (0.035 m) of this amine was refluxed in 150 ml. of toluene containing 6 g. of 88% formic acid. Water was removed by a Dean-Stark trap; when no more water came over (about 2 hours), the solution was cooled slightly and another 6 g. of formic acid was added. The solution was again refluxed until water did not come over. TLC (50/50, by volume, diethyl ether/petroleum ether) showed all starting material was gone and that a second compound had been formed. The solvent was evaporated under vacuum and the residual oil was dissolved in boiling ether. Upon cooling, the formamide

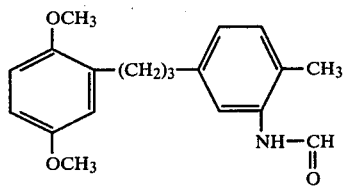

precipitated as a white powder (m.p. 107°-108° C.; 95% yield). 4.5 g. (0.0144 m) of the formamide was dissolved in 50 ml. of tetrahydrofuran and treated with 6.6 g. (0.087 m) of BH$_3$.DMS (boron-dimethyl sulfide). The solution was stirred over a weekend at room temperature, during which time a gelatinous precipitate formed. The reaction mixture was poured, with stirring, into 150 ml. water containing 10 ml. of concentrated hydrochloric acid. After cooling, the mixture was made strongly basic by the addition of solid sodium carbonate. The organic layer was taken up in diethyl ether and dried over drierite. Evaporation of the solvent gave an oil which crystallized on cooling. The solid was triturated in petroleum ether and filtered to give 4.0 g. (93% yield) of

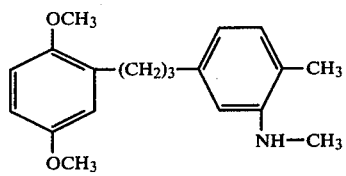

as a pure white powder, m.p. 39°-40° C.

The following example illustrates the preparation of a sulfonyl chloride-substituted intermediate which may be employed to prepare a variety of dye developers within the scope of this invention.

EXAMPLE 3

6.0 g. (0.012 m) of the monochloro intermediate

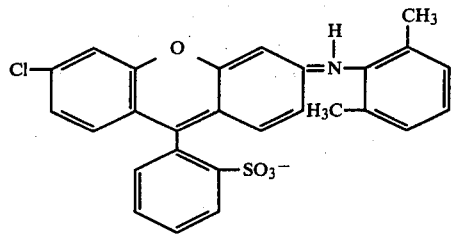

and 8.0 g. (0.036 m) of

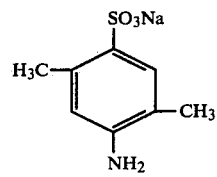

were heated in ethylene glycol overnight. The hot purple solution was poured into aqueous HCl, and the solid filtered off. The solid was slurried in water and solid potassium carbonate was added until a solution resulted. The solution was extracted twice with chloroform, and the aqueous layer was isolated and acidified to about pH 1 with concentrated hydrochloric acid. After heating to 90° C., salt was slowly added with stirring until solid dye began to precipitate. Stirring was continued until the temperature fell to 45°-50° C., and the dye was filtered. Purification gave 4.0 g. of

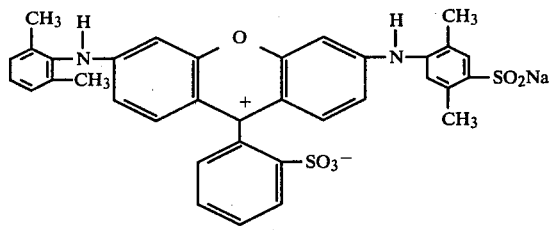

4.0 g. (6×10$^{-3}$ m) of this dye was slurried in 50 g. of thionyl chloride. 2.0 ml. of dimethyl formamide was added, and the solution was stirred at room temperature for 1 hour. After pouring onto ice, with stirring, the sulfonyl chloride was filtered off and washed well with water. After sucking under a rubber dam, the damp material was dissolved in tetrahydrofuran, dried over drierite and evaporated to give

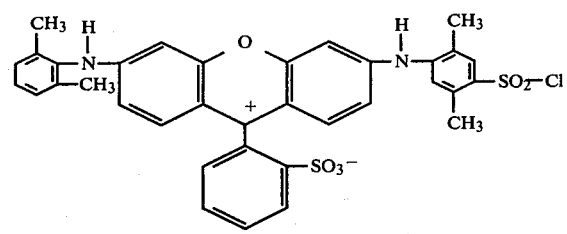

The sulfonyl chloride prepared in Example 3 may be reacted with a wide variety of amino-substituted hydroquinones to provide dye developers within the scope of this invention. Thus, for example, Dye 5 above may be prepared by reacting this sulfonyl chloride with

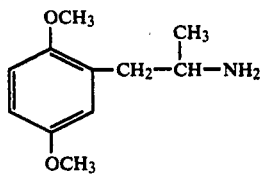

followed by demethylation. It will be readily recognized that a dye developer containing two such sulfonamido-linked hydroquinonyl groups may be obtained by replacing both chlorines of dichlorosulfone fluorescein with, e.g.,

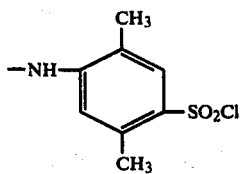

and reacting the resulting bis-sulfonylchloride with two equivalents of the desired amino-substituted hydroquinone.

The following example is given to illustrate the use of a dye developer of this invention in a diffusion transfer process.

EXAMPLE 4

A photosensitive element was prepared by coating a subcoated transparent 4 mil polyethylene terephthalate film base with a solution of Dye 2 and cellulose acetate hydrogen phthalate dissolved in a 50:50 mixture, by volume, of acetone and methyl cellosolve to provide a layer containing approximately 24 mg./ft.$^2$ of Dye 2 and approximately 24 mg./ft.$^2$ of cellulose acetate hydrogen phthalate. Over this dye layer was coated a green-sensitive silver iodobromide emulsion at a coverage of about 44 mg./ft.$^2$ of silver and 88 mg./ft.$^2$ of gelatin. Over the silver halide emulsion layer there was coated a gelatin layer containing about 30 mg./ft.$^2$ of gelatin and 7.5 mg./ft.$^2$ of 4'-methylphenylhydroquinone. The resulting photosensitive element then was exposed (2 meter-candle-seconds) on a sensitometer to a test exposure scale or step-wedge. In the dark, a layer approximately 0.0020 inch of a processing composition containing (approximate concentrations):

| | |
|---|---|
| Potassium hydroxide (45% solution) | 380 g. |
| Carboxymethyl hydroxyethyl cellulose | 52 g. |
| Titanium dioxide | 2028 g. |
| 6-methyl uracil | 14.2 g. |
| bis-($\beta$-aminoethyl)-sulfide | 1 g. |
| 5-bromo-6-methyl-4-azabenzimidazole | 1.5 g. |
| Benzotriazole | 27 g. |
| Lithium nitrate | 0.1 g. |
| Colloidal silica (30% aqueous solution) | 88 g. |
| N—2-hydroxyethyl-N,N',N'—tris-carboxymethyl-ethylene diamine | 40 g. |
| Lithium hydroxide | 5 g. |
| Polyethylene glycol (molecular weight 6,000) | 26 g. |
| N—phenethyl-$\alpha$-picolinium bromide (50% aqueous solution) | 70 g. |
| N—benzyl-$\alpha$-picolinium bromide (50% aqueous solution) | 121 g. |
| 6-benzylamino-purine | 19 g. |
| Water | 1757 g. | between the exposed photosensitive element and a transparent image-receiving element as said elements were brought into superposed relationship. The resulting laminate was kept in the dark for 10 minutes (to avoid fogging the developed silver halide emulsion by light passing through the transparent film base). When brought into the light, a well defined positive magenta dye image (reflection density $D_{max}$ 1.70, $D_{min}$ 0.33) was visible through the transparent base of the image-receiving element against the white layer of titanium dioxide provided by the processing composition, without separating the superposed elements. Inspection of the developed photosensitive element through the transparent film base of the photosensitive element showed a well defined negative silver image in the developed silver halide emulsion layer, and very little magenta dye developer left in undeveloped areas, indicating an efficient use of the coated dye developer.

The image-receiving element used in Example 4 comprised a 4 mil transparent polyethylene terephthalate carrying, in order:

1. a mixture of about 8 parts, by weight, of a partial butyl ester of polyethylene/maleic anhydride and about 1 part, by weight, of polyvinyl butyral to provide a polymeric acid layer having a coverage of about 2500 mg./ft.$^2$;

2. a mixture of about 7 parts, by weight, of hydroxypropyl cellulose (Klucel J12HB, Hercules, Inc., Wilmington, Del.), and about 4 parts, by weight, of polyvinyl alcohol; to form a spacer layer having a coverage of about 500 mg./ft.$^2$; and 3. a mixture of about 3 parts of (a) a mixture of about 2 parts of polyvinyl alcohol and 1 part of poly-4-vinylpyridine and 1 part of a graft copolymer of 4-vinylpyridine and vinyl benzyl trimethyl ammonium chloride on hydroxyethyl cellulose (mole ratio 1:0.5:1) to form an image-receiving layer having a coverage of about 300 mg./ft.$^2$ The FIGURE is a graph of the percent reflectance of visible light against wavelength in nanometers of a magenta monochrome reflection print prepared in substantially the same manner as in the above example, made three days after processing and using magnesium carbonate as the reference material.

As noted above, magenta image dye-providing materials containing the chromophoric system:

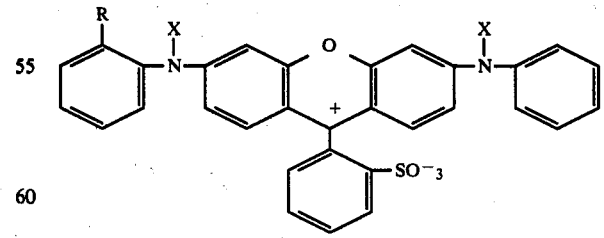

in accordance with this invention are not restricted to dye developers, but include many other types of initially diffusible and initially non-diffusible image dye-providing materials.

Thus, for example, an initially diffusible coupling dye useful in the diffusion transfer process described in U.S.

Pat. No. 3,087,817 issued Apr. 30, 1963 to Howard G. Rogers may be prepared by substituting one or both of the anilino groups with a color coupling moiety, such as a phenol or naphthol having a free position para to the hydroxyl group. As an example of such a coupling dye, mention may be made of:

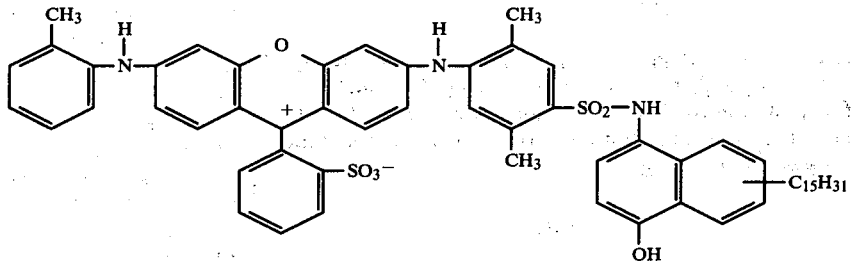

This dye is initially diffusible, but is rendered non-diffusible by coupling with the oxidation product of a color developer, e.g., a p-phenylene diamine or a p-aminophenol, to form a less diffusible product. If the coupling position is substituted by a substituent which renders the dye initially nondiffusible by virtue of a ballast group and which substitutent is displaceable upon coupling, such a dye may be employed to provide a diffusible dye where coupling occurs, employing the principles described, e.g., in U.S. Pat. No. 3,227,550 issued on Jan. 6, 1966.

As an example of an initially non-diffusible "redox dye releaser" dye useful in the diffusion transfer process described in U.S. Pat. No. 4,076,529 issued Feb. 28, 1978 to Fleckenstein and Figueras, mention may be made of

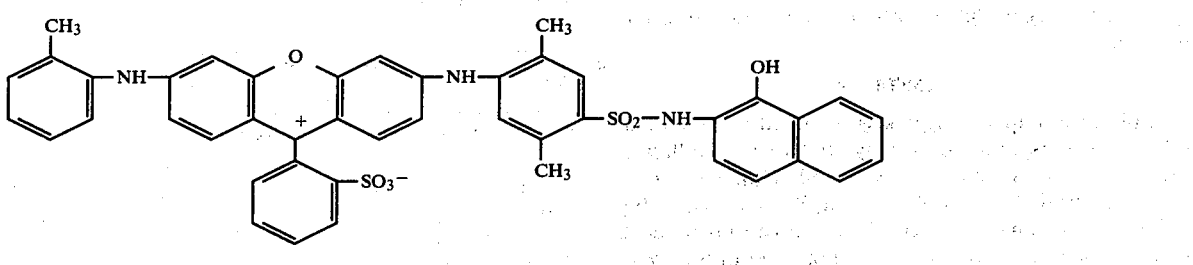

Other sulfonamido phenol or naphthol groups known in the art, e.g., in U.S. Pat. No. 4,053,312 issued Oct. 11, 1977 to Fleckenstein and in U.S. Pat. No. 4,055,428 issued Oct. 25, 1977 to Koyama et al., to cleave, in alkaline solution, at the sulfonamido group following oxidation may be used in place of the p-sulfonamidonaphthol group illustrated above.

U.S. Pat. No. 3,719,489 issued Mar. 6, 1973 to Cieciuch, Luhowy, Meneghini and Rogers discloses diffusion transfer processes wherein a diffusible image dye-providing material is formed by the silver-catalyzed cleavage of a thiazolidine group of an initially non-diffusible image dye-providing material. Examples of image dye-providing materials within the scope of this invention and which may be used in said thiazolidine dye-release system include:

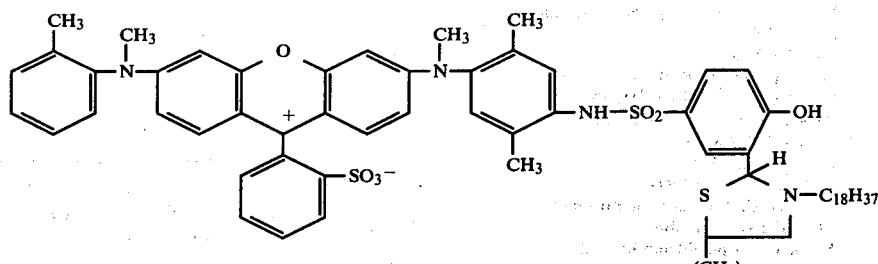

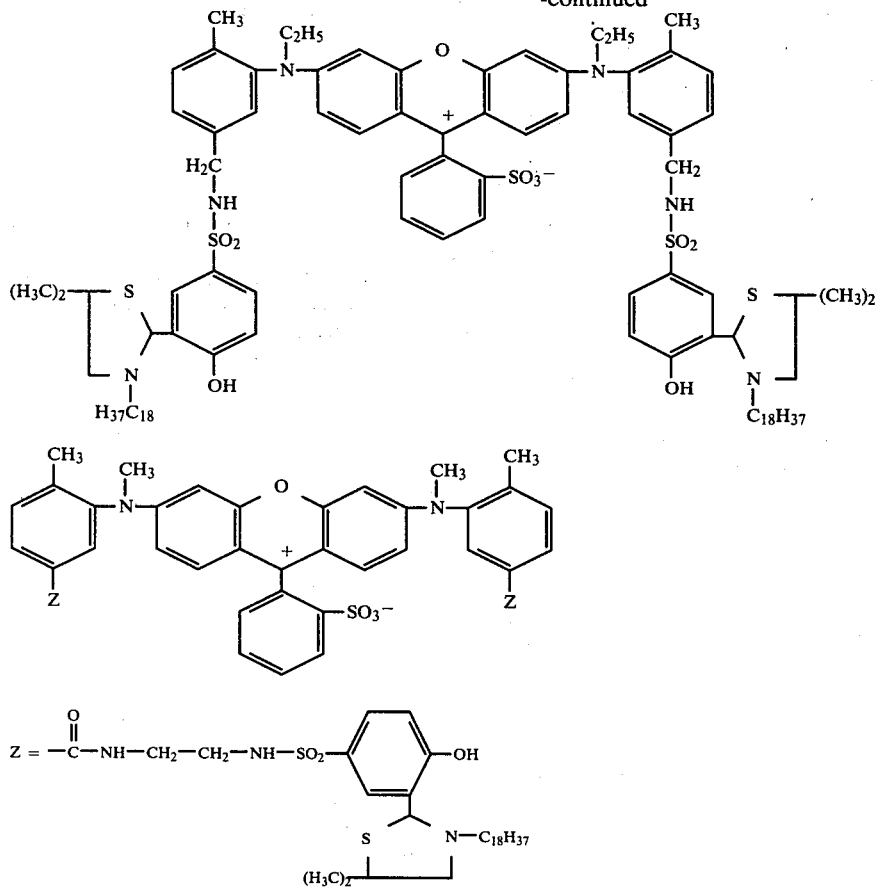

Another class of initially non-diffusible image dye-providing materials are described in U.S. Pat. No. 3,433,939 issued May 13, 1969 to Bloom and Rogers release a diffusible dye following oxidation and intramolecular ring closure. An example of an image dye-providing material within the scope of this invention which may be used in the processes of said patent is

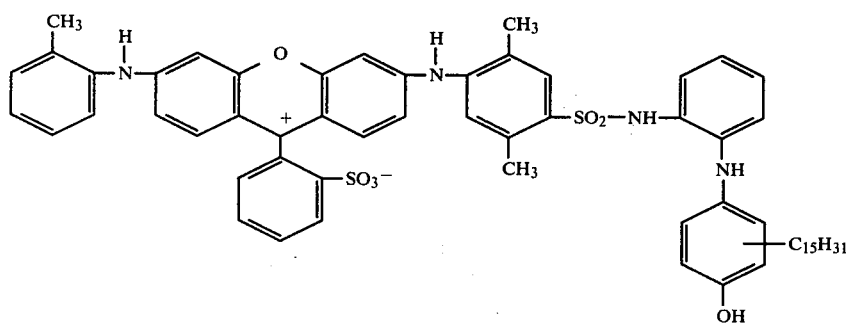

It will be recognized that the above illustrative initially non-diffusible image dye-providing materials may be prepared in a routine manner from, e.g., sulfonyl chloride of the chromophore-containing moiety (e.g., the sulfonyl chloride prepared in Example 3) and the appropriate amino-substituted diffusion control group, the syntheses of which are described in the noted patents and to which reference may be made for detailed descriptions, including photographic utilization.

Other image dye-providing materials which cleave in alkali following oxidation may be provided by use of a compound within Formula D above wherein A is —O— or —S— and the hydroquinonyl group contains a ballast group, e.g.,

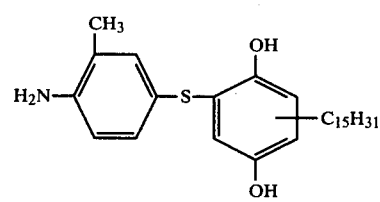

in accordance with the disclosure of U.S. Pat. No. 3,725,062 issued Apr. 3, 1973 to Anderson and Lum.

While the ballast group in the above illustrations has been a long chain alkyl group, it will be understood that other ballast groups shown in the cross-referenced patents may also be used.

In the use of a non-diffusible image dye-providing material which releases a diffusible image dye-providing material following oxidation in an alkaline environment, the requisite oxidation may be effected by the oxidation product of a mobile developing agent used to develop the photoexposed silver halide emulsion. A particularly effective developing agent for this purpose is 1-phenyl-4,4-dimethyl-3-pyrazolidone; other suitable developing agents are described in the cross-referenced patents.

EXAMPLE 5

A film unit was prepared as follows: the negative element was made up of a polyethylene terephthalate photographic film base with the following layers coated thereon in succession:

1. a magenta dye developer layer at a coverage of 32 mgs/ft$^2$ (344.4 mgs/m$^2$) of Dye 19 dispersed in 32 mgs/ft$^2$ (344.4 mgs/m$^2$) of cellulose acetate hydrogen phthalate;
2. a green-sensitive gelatino silver iodobromo emulsion coated at a coverage of 75 mgs/ft$^2$ (807.3 mgs/ft$^2$) of silver and 88 mgs/ft$^2$ (947.2 mgs/m$^2$) of gelatin;
3. a layer of 30 mgs/ft$^2$ (322.9 mgs/m$^2$) of gelatin.

The image-receiving element comprised a transparent polyethylene terephthalate photographic film base with the following layers coated thereon in succession:

1. as a polymeric acid layer, approximately 9 parts of a half-butyl ester of polyethylene/maleic anhydride copolymer and 1 part of polyvinyl butyral coated at a coverage of about 2600 mgs/ft$^2$ (27,986 mgs/m$^2$) and including an ultraviolet absorbing material;
2. a timing layer containing about 450 mgs/ft$^2$ (4843.8 mgs/m$^2$) of a 60-30-4-6 tetrapolymer of butyl acrylate, diacetone acrylamide, styrene and methacrylic acid including about 7%–8% polyvinyl alcohol; and
3. a polymeric image-receiving layer of: (a) 3 parts of a mixture of 2 parts polyvinyl alcohol and 1 part poly-4-vinylpyridine and (b) 1 part of a graft copolymer comprised of 4-vinylpyridine (4VP) and vinylbenzyl trimethyl ammonium chloride (TMQ) grafted onto hydroxyethyl cellulose (HEC) at a ratio of HEC/4VP/TMQ of 2.2/2.2/1 coated at a coverage of about 300 mgs/ft$^2$ (3229.2 mgs/m$^2$).

The film unit was processed with a processing composition comprised of:

| | |
|---|---|
| Water | 1757 gms |
| Bis-(β-aminoethyl)-sulfide | 1.04 cc |
| Titanium dioxide | 2028 gms |
| Potassium hydroxide (50% solution) | 380.3 gms |
| Carboxymethyl hydroxyethyl cellulose | 51.8 gms |
| Benzotriazole | 26.9 gms |
| 6-methyluracil | 14.2 gms |
| N—Hydroxyethyl-N,N',N'—tris-carboxymethyl ethylene diamine | 40.2 gms |
| 6-methyl-5-bromo-4-azabenzimidazole | 1.34 gms |
| 6-benzylaminopurine | 19.0 gms |
| Lithium nitrate | 4.72 gms |
| Polyethylene glycol (MW 6000) | 26.1 gms |

| -continued | |
|---|---|
| Collodial silica (50% aqueous dispersion) | 88.5 gms |
| N—benzyl-α-picolinium bromide (50% solution) | 121.3 gms |
| N—phenethyl-α-picolinium bromide (50% solution) | 70.0 gms |

The film unit was exposed (2 meter-candle-seconds) on a sensitometer to a test exposure scale with green and blue light and then passed through a pair of rollers at a gap spacing of about 0.0020 inches. The unit was allowed to remain in the dark for about 10 minutes. The film unit was kept intact and maximum and minimum reflection densities were measured.

EXAMPLE 6

The procedure of Example 5 was repeated with the exception that the dye developer layer of the negative element was made up of 28.0 mgs/ft$^2$ (301.4 mgs/m$^2$) of Dye 18 and 28.0 mgs/ft$^2$ (301.4 mgs/m$^2$) of cellulose acetate hydrogen phthalate.

EXAMPLE 7

The procedure of Example 6 was repeated with the exception that the gelatin layer of the negative element also included 7.5 mgs/ft$^2$ (80.7 mgs/m$^2$ of 4'-methylphenyl hydroquinone.

EXAMPLE 8

The procedure of Example 7 was repeated with the exception that the gelatin layer of the negative element also included 7.5 mgs/ft$^2$ (80.7 mgs/m$^2$ of 4'-methylphenyl hydroquinone.

EXAMPLE 9

The procedure of Example 5 was repeated with the exception that the dye developer layer of the negative element was made up of 24.6 mgs/ft$^2$ of Dye 2 and 24.6 mgs/ft$^2$ of cellulose acetate hydrogen phthalate.

EXAMPLE 10

The procedure of Example 9 was repeated except that the gelatin layer of the negative element also included 7.5 mgs/ft$^2$ (80.7 mgs/m$^2$) of 4'-methylphenyl hydroquinone.

The monochrome, magenta transfer images obtained in Examples 5–10 exhibited the following reflection densities to green light:

| | $D_{max}$ | $D_{min}$ |
|---|---|---|
| Example 5 | 2.09 | 0.69 |
| Example 6 | 2.03 | 0.64 |
| Example 7 | 2.20 | 0.25 |
| Example 8 | 2.00 | 0.22 |
| Example 9 | 2.22 | 0.57 |
| Example 10 | 2.33 | 0.30 |

EXAMPLE 11

A multicolor photosensitive element using, as the cyan and yellow dye developers cyan:

-continued

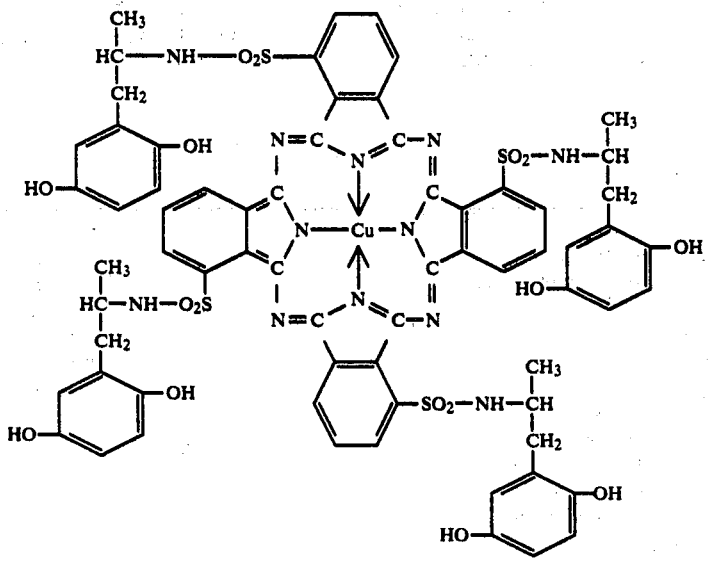

yellow:

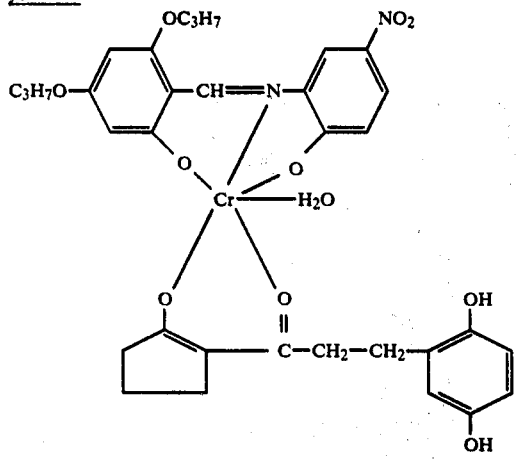

and Dye 18 as the magenta dye developer, by coating a gelatin-subcoated 4 mil opaque polyethylene terephthalate film base with the following layers:

1. a layer of cyan dye developer dispersed in gelatin and coated at a coverage of about 630 mg/m² of dye, about 391 mg/m² of gelatin, about 280 mg/m² of N-n-dodecylaminopurine, and about 88 mg/m² of 4'-methylphenyl hydroquinone;

2. a red-sensitive gelatino silver iodobromide emulsion coated at a coverage of about 1054 mg/m² of silver and about 6324 mg/m² of gelatin;

3. a layer of a 95:5 mixture of a 60-30-4-6 copolymer of butylacrylate, diacetone acrylamide, styrene and methacrylic acid and polyacrylamide coated at a coverage of about 1076 mg/m²;

4. a layer of magenta dye developer dispersed in gelatin and coated at a coverage of about 648 mg/m² of dye and about 324 mg/m² of gelatin;

5. a green-sensitive gelatino silver iodobromide emulsion coated at a coverage of about 749 mg/m² of silver and about 330 mg/m² of gelatin;

6. a layer containing the copolymer referred to above in layer 3 and polyacrylamide in a 91:9 ratio coated at a coverage of about 1816 mg/m²;

7. a layer of yellow dye developer dispersed in gelatin and coated at a coverage of about 659 mg/m² of dye, about 318 mg/m² of gelatin, and about 108 mg/m² of N-n-dodecylamino-purine;

8. a blue-sensitive gelatino silver iodobromide emulsion layer coated at a coverage of about 990 mg/m² of silver, about 495 mg/m² of gelatin; and 9. a layer of gelatin coated at a coverage of about 320 mg/m² of gelatin.

A transparent 4 mil polyethylene terephthalate film base was coated, in succession, with the following layers to form an image-receiving component:

1. as a polymeric acid layer, a mixture of a partial butyl ester of polyethylene/maleic anhydride copolymer and polyvinyl butyral at a ratio of about 9:1 at a coverage of about 2,500 mg/ft²;

2. a timing layer containing about a 45:0.7 ratio of a 60-30-4-6 copolymer of butylacrylate, diacetone acrylamide, stryene and methacrylic acid and polyvinyl alcohol at a coverage of about 450 mg/ft²; and 3. an image-receiving layer containing a 2:1:1 mixture of polyvinyl alcohol, poly-4-vinyl pyridine and a graft copolymer of 4'-vinyl pyridine and vinylbenzyl trimethyl ammonium chloride on hydroxyethyl cellulose (2.2:1:2.2 ratio) at a coverage of about 300 mg/ft². Over the image-receiving layer there was coated about 100 mg/ft² of a 70:30 mixture of Pluronic F-127 polyoxyethylene polyoxypropylene block copolymer and polyvinyl alcohol as a decolorizing layer. (Such "decolorizing" layers are the subject of the copending application of Edwin H. Land, Leon D. Cerankowski and Neil Mattuci, Ser. No. 33,001, filed Apr. 24, 1979, now abandoned and replaced by continuation-in-part application Ser. No. 143,293 filed Apr. 24, 1980, now U.S. Pat. No. 4,298,674 issued Nov. 3, 1981.) The photosensitive component was photoexposed and then taped to one end of the image-receiving component with a rupturable container retaining an aqueous alkaline processing solution fixedly mounted on the leading edge of each of the components, by pressure-sensitive tapes to make a film unit, so that, upon application of compressive pressure to the container to rupture the container's marginal seal, its contents would be distributed between the decolorizing layer and the gelatin overcoat layer of the photosensitive component. The aqueous alkaline processing composition comprised:

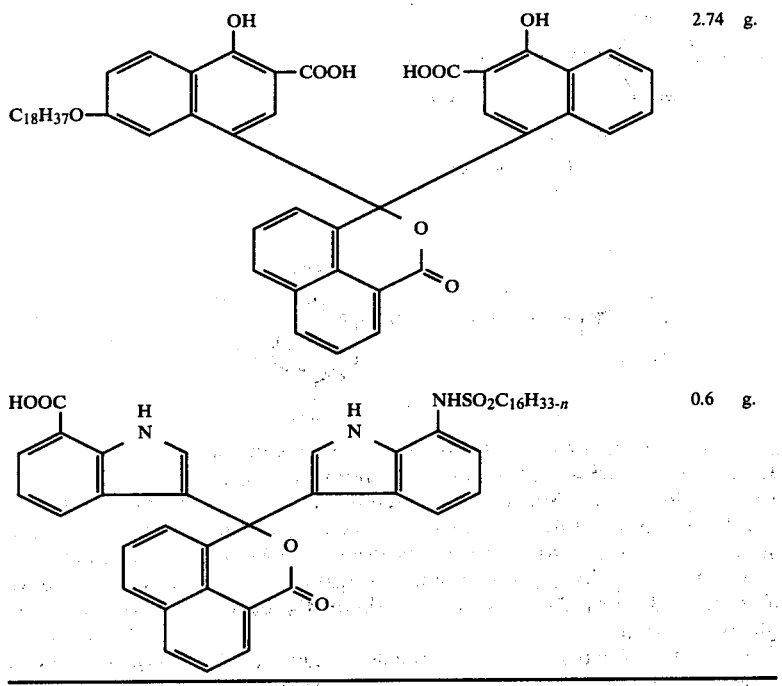

| | |
|---|---|
| Water | 100 g. |
| Potassium hydroxide (85%) | 10.1 g. |
| N—phenethyl-α-picolinium bromide | 2.6 g. |
| Titanium dioxide | 77.1 g. |
| 6-methyl uracil | 0.6 g. |
| bis-(β-aminoethyl)-sulfide | 0.04 g. |
| Benzotriazole | 1.1 g. |
| Colloidal silica (solids based on 30% SiO₂ dispersion) | 0.56 g. |
| N—2-hydroxyethyl-N,N',N'—tris-carboxymethyl-ethylene diamine | 1.52 g. |
| 4-aminopyrazolo (3,4d)pyrimidine | 0.51 g. |
| polyethylene glycol (molecular weight about 4000) | 0.91 g. |
| poly-diacetone acrylamide oxime | 1.6 g. |
| [structure] | 2.74 g. |
| [structure] | 0.6 g. |

A layer approximately 0.0030" thick of the processing composition was distributed by passing the film unit between a pair of pressure-applying rolls and into a lighted area. The resulting laminate was maintained intact to provide a multicolor integral negative-positive reflection print which exhibited good color quality and separation.

EXAMPLE 12

Dye 18 was prepared as follows:
10 g of a xanthene dye represented by the formula

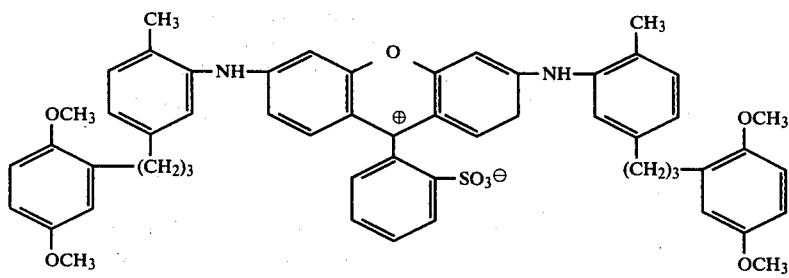

was suspended in 75 ml of dimethyl sulfoxide at room temperature under nitrogen gas. To this suspension there was added 1.8 g of a 50% sodium hydride dispersion in oil and the mixture stirred for 30 minutes at room temperature. A blue solution developed. To the solution there was added 10 g of a tosylate compound represented by the structural formula

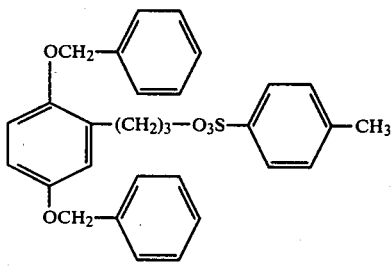

and the solution stirred for 3 hours at room temperature. TLC on silica gel with 5/95 methanol/methylene chloride, by volume, showed that none of the dye intermediate remained. Methyl iodide (2 ml) was added and the mixture was stirred for one hour. TLC showed that the reaction was complete. The reaction mixture was poured into 1 liter of water containing 1 ml of conc. HCl and the precipitate was filtered off. The precipitate was placed back into water, stirred well, collected by filtration and vacuum dried to give 14.0 g. The product was dissolved in 400 ml of methylene chloride and 125 g of silica gel added to the solution. The stirred mixture was placed in a sintered glass funnel and filtered while washing with methylene chloride. The dye was then extracted with 5/95 methanol/methylene chloride, by volume, and evaporated to dryness. The dye is represented by the structural formula

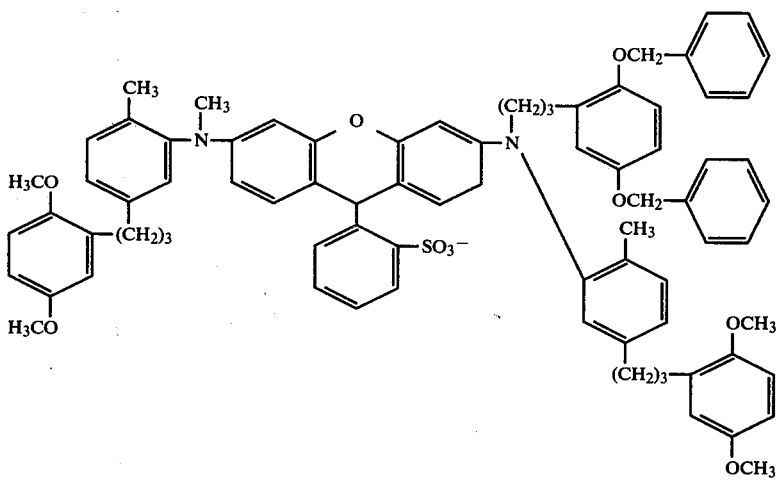

A solution of 5.0 g of the thus-prepared dye in 100 ml of methylene chloride was added to a stirred solution of 15 ml of boron tribromide in 500 ml of methylene chloride, under nitrogen and cooled to 5° C. The magenta solution was allowed to warm to room temperature. TLC on silica gel showed two spots. A sample of the solution was heated to reflux with no apparent change in the TLC results. Water was added dropwise to the solution and a magenta precipitate formed. The precipitate was collected by filtration, washed well with methylene chloride and vacuum dried at 80° C. to give 9.0 g of solid. The solid was dissolved in methanol containing several drops of conc. HCl, refluxed, and poured into 1000 ml of ether. The precipitate was collected by filtration and dried to give 3.8 g of product.

The 3.8 g sample was placed on 60 g of sea sand with methanol. The mixture was placed in a steel column and an additional 250 g of sea sand were added. The column was placed on line on a high pressure chromatography unit and washed with a succession of solvents as follows (parts are by volume):

1 liter methylene chloride
2 liters 1/99 methanol/methylene chloride
4 liters 2/98 methanol/methylene chloride
4 liters 3/97 methanol/methylene chloride
12 liters 5/95 methanol/methylene chloride
3 liters 6/94 methanol/methylene chloride The appropriate solvent fractions as determined by thin layer chromatography were collected and evaporated to give 1.8 g of the dye developer.

TLC of the material showed traces of impurities. The sample was again placed on 60 g of sea sand and placed back in the steel column (which was first washed with 9/91 methanol/methylene chloride, by volume, and then with methylene chloride). The column was washed with a succession of solvents as follows (parts are by volume):
1 liter methylene chloride
3 liters 2/98 methanol/methylene chloride
3 liters 3/97 methanol/methylene chloride
1 liter 4/96 methanol/methylene chloride
10 liters 4/96 methanol/methylene chloride
3 liters 6/94 methanol/methylene chloride The appropriate solvent fractions as determined by thin layer chromatography were collected and evaporated to give 1.7 g of Dye 18 which was shown to be pure by TLC. The product exhibited maximum absorption in methyl cellosolve at 553 nm, $\epsilon=117,500$. An NMR spectrum of the product confirmed the structure.

EXAMPLE 13

A film unit was prepared as follows:

The photosensitive element comprised an opaque subcoated polyethylene terephthalate film base on which the following layers were coated in succession:

(1) a layer of sodium cellulose sulfate coated at a coverage of about 21 mgs/m$^2$;

(2) a cyan dye developer layer comprising about 635 mgs/m$^2$ of the cyan dye developer used in Example 11, about 429 mgs/m$^2$ of gelatin, about 238 mgs/m$^2$ of dodecylaminopurine and about 128 mgs/m$^2$ of 4'-metylphenyl hydroquinone;

(3) a red-sensitive gelatino silver iodobromide (1.8 microns) emulsion layer coated at a coverage of about 1900 mgs/m$^2$ of silver and about 1140 mgs/m$^2$ of gelatin;

(4) an interlayer comprising about 2000 mgs/m$^2$ of a 60-30-4-6 tetrapolymer of butylacrylate, diacetone acrylamide, styrene and methacrylic acid and about 30 mgs/m$^2$ of polyacrylamide;

(5) a magenta dye developer layer comprising about 666 mgs/m$^2$ of Dye 18, about 323 mgs/m$^2$ of gelatin and about 150 mgs/m$^2$ of dodecylaminopurine;

(6) a green-sensitive silver iodobromide (1.11 microns) emulsion layer coated at a coverage of about 700 mgs/m$^2$ of silver and about 308 mgs/m$^2$ of gelatin;

(7) a green-sensitive silver iodobromide (1.8 microns) emulsion layer coated at a coverage of about 600 mgs/m$^2$ of silver and about 288 mgs/m$^2$ of gelatin;

(8) an interlayer comprising about 1380 mgs/m$^2$ of a 60-30-4-6 tetrapolymer of butylacrylate, diacetone acrylamide, styrene and methacrylic acid and about 30 mgs/m$^2$ of polyacrylamide;

(9) a spacer layer comprising about 285 mgs/m$^2$ of 2-phenylbenzimidazole and about 142.5 mgs/m$^2$ of gelatin;

(10) a yellow dye developer layer comprising about 820 mgs/m$^2$ of the yellow dye developer used in Example 11 and about 328 mgs/m$^2$ of gelatin;

(11) a blue-sensitive silver iodobromide (1.5 microns) layer coated at a coverage of about 1050 mgs/m$^2$ of silver, 660 mgs/m$^2$ of gelatin and about 306 mgs/m$^2$ of 4'-methylphenyl hydroquinone; and

(12) an overcoat layer of about 484 mgs/m$^2$ of gelatin.

The image-receiving element comprised a transparent subcoated polyethylene terephthalate film base on which the following layers were coated in succession:

(1) as a polymeric acid layer approximately 9 parts of a ½ butyl ester of polyethylene/maleic anhydride copolymer and 1 part of polyvinyl butyral coated at a coverage of about 2450 mgs/ft$^2$ (26,372 mgs/m$^2$);

(2) a timing layer coated at a coverage of about 270 mgs/ft$^2$ (2906 mgs/m$^2$ of a 60-30-4-6 tetrapolymer of butylacrylate, diacetone acrylamide, styrene and methacrylic acid and about 30 mgs/ft$^2$ (323 mgs/m$^2$ of polyvinyl alcohol;

(3) a polymeric image-receiving layer coated at a coverage of about 10 mgs/ft$^2$ (108 mgs/m$^2$ of 1,4-butanediol diglycidyl ether and about 300 mgs/ft$^2$ (3229 mgs/m$^2$ of: (a) 3 parts of a mixture of 2 parts polyvinyl alcohol and 1 part poly-4-vinyl pyridine and (b) 1 part of a graft copolymer comprised of 4-vinyl pyridine (4VP) and vinyl benzyl trimethyl ammonium chloride (TMQ) grafted onto hydroxyethyl cellulose (HEC) at a ratio HEC/4VP/TMQ of 2.2/2.2/1; and (4) a topcoat layer of polyvinyl alcohol coated at a coverage of about 40 mgs./ft$^2$ (430 mgs/m$^2$).

A second film unit was prepared which was identical with the exception that the magenta dye developer layer included about 540 mgs/m$^2$ of Dye 2 instead of Dye 18.

The amounts of Dyes 2 and 18 used in the above film units were chosen so as to provide substantially equivalent molar amounts of the dye developers. Thus $617\times10^{-5}$ mole of Dye 18 (MW 1011) and $617\times10^{-5}$ mole of Dye 2 (MW 875) were present in the respective film units.

The film units were exposed on a sensitometer to a test exposure scale with white light and then processed by passing them through a pair of rollers so as to distribute a layer of the following processing composition approximately 0.0030 inch thick between the superposed photosensitive and image-receiving elements:

| Water | 1622 ml |
|---|---|
| TiO$_2$ | 2312.0 gms |
| Oximated polydiacetone acrylamide | 32.0 gms |
| Potassium hydroxide (45% solution) | 486.6 gms |
| Benzotriazole | 22.0 gms |
| 4-Aminopyrazolo-(3,4d) pyrimidine | 10.0 gms |
| 6-Methyl uracil | 12.0 gms |
| N—hydroxyethyl-N,N',N'—tris-carboxymethyl ethylene diamine | 30.0 gms |
| Polyethylene glycol (M.W. 4000) | 18.0 gms |
| Bis(2-aminoethyl)sulfide | 0.8 gms |
| Collodial silica (30% solids) | 37.0 gms |
| N—phenethyl-α-picolinium bromide (50% solids) | 102.0 gms |

Since the processing composition did not contain opacifying dyes the film units were kept in the dark for a period of about five minutes after the processing composition was applied. The reflection densities of the neutral area of the images were:

|  |  | Red | Green | Blue |
|---|---|---|---|---|
| Dye 18: | D$_{max}$ | 1.87 | 2.36 | 2.18 |
|  | D$_{min}$ | 0.12 | 0.16 | 0.24 |
| Dye 2: | D$_{max}$ | 1.82 | 1.88 | 2.12 |
|  | D$_{min}$ | 0.12 | 0.15 | 0.26 |

It will be noted that Dye 18 gave a much higher transfer density than Dye 2. It has been determined that Dye 2 transfers at a much slower rate than Dye 18. Since the dyes are insolubilized by the pH reduction effected after a predetermined time by the polymeric acid neutralizing layer, it will be apparent that the difference in the magenta transfer density is due to the combination of the difference in transfer rates and the pH reduction. Other experiments have shown that if the pH is not reduced, i.e., the neutralizing layer is omitted, substantially similar transfer densities may be obtained even though the rate of density build-up is slower. Similar experiments have also shown that the transfer rate of Dye 2 also is reduced by the presence in the processing composition of opacifying dyes such as used in Example 5.

The magenta image dyes provided by this invention have been found to provide very desirable spectral properties, particularly high green absorption and high blue transmission, together with high extinction coefficients, thereby providing multicolor images exhibiting improved reproduction of blues, greens and pastel colors. The preferred magenta dyes of this invention exhibit maximum absorption at about 540 to 555 nanometers (dissolved in methyl cellosolve) and have a narrow band width. The dye developers of this invention have been found to give very good transfer control, with very good deltas between maximum and minimum densities. While it is general practice in dye developer transfer processes to have an auxiliary developing agent, e.g., 4'-methylphenyl hydroquinone present, it has been found that the dye developers of this invention exhibit very good silver halide developing action without such auxiliary developing agents, and that the total amount of auxiliary developing agent in a given system therefore may be reduced. In turn, this reduces the potential for stain in highlight regions of the transfer image due to oxidized auxiliary developing agent. It has also been observed that the oxidized form of these dye developers, illustrated for example by Dyes 2 and 18, exhibits a large difference in alkali solubility compared with the unoxidized form. The dye developers of this invention also exhibit a strong resistance to post-processing transfer, e.g., solubilization and transfer after pH-reduction to impart a stain or "pinking" to highlight areas. While the reasons for these desirable properties are not well understood, it is believed that the presence of the positive charge associated with the nucleus is a significant factor.

Dyes of similar chromophoric systems, commonly referred to as rhodamine or xanthene dyes, tend to exhibit fluorescence, an undesirable property. N-alkylation has tended to increase fluorescence. The presence of a phenolic group, particularly a hydroquinonyl group, unexpectedly has been found to reduce fluorescence, particularly where X' is not hydrogen.

In the above examples the neutralizing and timing layers were positioned between the image-receiving layer and its transparent support. In certain embodiments it is advantageous to position the neutralizing and timing layers in the photosensitive element, i.e., between the cyan dye developer layer and the opaque support, in the manner described in U.S. Pat. No. 3,573,043 issued Mar. 30, 1971 to Edwin H. Land.

It will also be understood that the image dye-providing materials of this invention may be used in film structures of the type described in U.S. Pat. No. 3,594,165 issued July 20, 1971 to Howard G. Rogers.

Since certain changes may be made in the above product and process without departing from the scope of the invention herein involved, it is intended that all matter contained in the above description shall be interpreted as illustrative and not in a limiting sense.

What is claimed is:

1. A compound of the formula

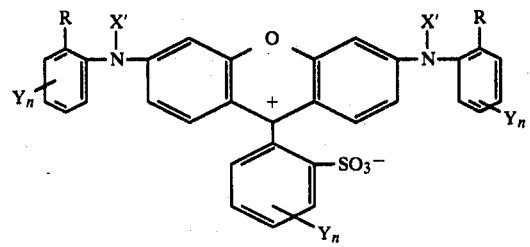

wherein each R is the same or different and is an alkyl group, each Y is a diffusion control substituent —A—D wherein D is a diffusion control moiety and A is selected from the group consisting of a covalent bond, alkylene, —SO$_2$—NH-alkylene, —SO$_2$—, —S-alkylene, —S—, —O—,

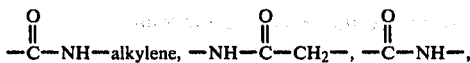

and —SO$_2$NH—; each X' is the same or different and is hydrogen, alkyl or —(CH$_2$—X$^2$—D)$_n$ wherein X$^2$ is alkylene, and n is 0 or 1, provided that at least one n is 1, said diffusion control moiety D being selected from the group consisting of a hydroquinonyl silver halide developing moiety, a color coupling phenol or naphthol moiety having an available coupling position para to the hydroxyl group, a sulfonamido phenol group which will cleave or ring close following oxidation, and a thiazolidine group capable of silver-catalyzed cleavage.

2. A compound as defined in claim 1 wherein X' is not hydrogen.

3. A compound as defined in claim 1 wherein each D is a hydroquinoyl group.

4. A compound as defined in claim 1 wherein said diffusion control moiety D is a color coupling phenol or naphthol moiety having an available coupling position para to the hydroxyl group.

5. A compound as defined in claim 1 wherein said diffusion control moiety D is a sulfonamido phenol group which will cleave or ring close following oxidation.

6. A compound as defined in claim 1 wherein said diffusion control group is a thiazolidine group capable of silver-catalyzed cleavage.

7. A compound as defined in claim 1 wherein A is alkylene.

8. A compound as defined in claim 1 wherein A is a covalent bond.

9. A compound having the formula:

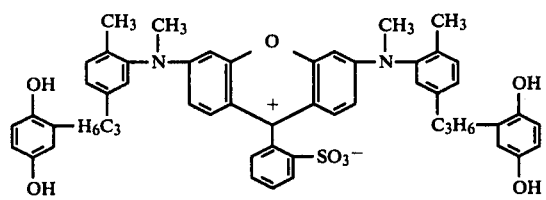

10. A compound having the formula:

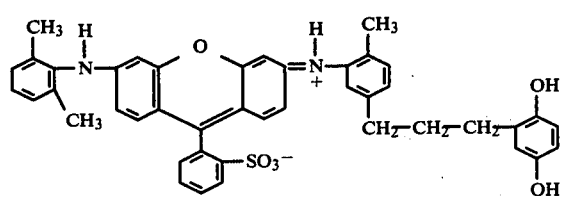
11. A compound having the formula:
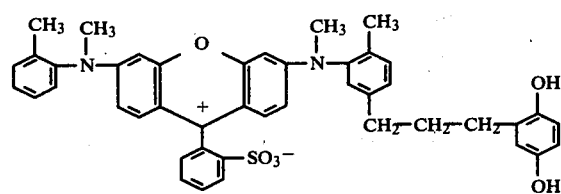
12. A compound having the formula:
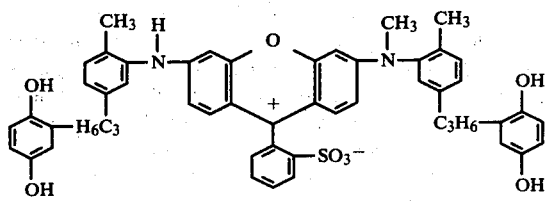
13. A compound having the formula:
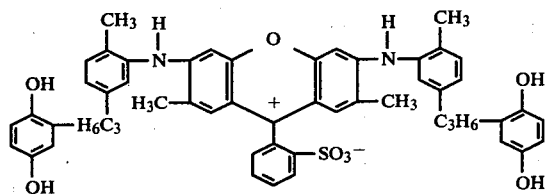
14. A compound having the formula:
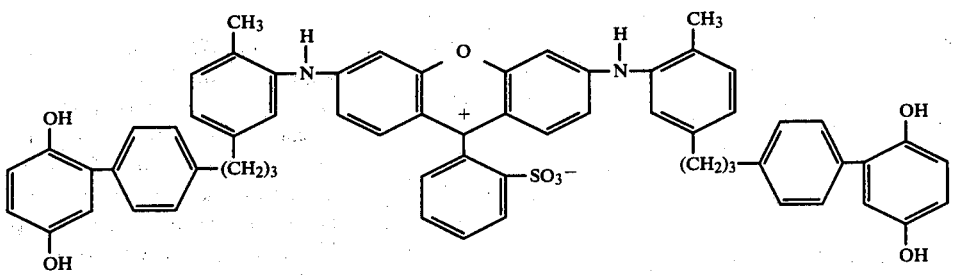
15. A compound having the formula:
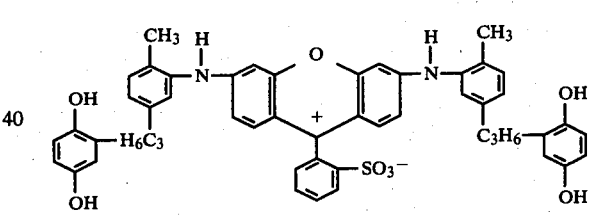
* * * * *